(12) United States Patent
Ringuette

(10) Patent No.: US 10,384,245 B2
(45) Date of Patent: Aug. 20, 2019

(54) SYSTEMS, METHODS AND TREATMENT CELLS FOR REHABILITATING AND VALORIZING A SOIL

(75) Inventor: Benoit Ringuette, Saint-Laurent (CA)

(73) Assignee: Terra Neutra Inc., Newark, DE (US)

(*) Notice: Subject to any disclaimer, the term of this patent is extended or adjusted under 35 U.S.C. 154(b) by 0 days.

(21) Appl. No.: 12/743,102

(22) PCT Filed: Nov. 14, 2008

(86) PCT No.: PCT/CA2008/001995
§ 371 (c)(1),
(2), (4) Date: Jul. 1, 2010

(87) PCT Pub. No.: WO2009/062300
PCT Pub. Date: May 22, 2009

(65) Prior Publication Data
US 2010/0263751 A1    Oct. 21, 2010

Related U.S. Application Data

(60) Provisional application No. 60/988,126, filed on Nov. 15, 2007.

(51) Int. Cl.
    *B09C 1/06*    (2006.01)
(52) U.S. Cl.
    CPC ......... *B09C 1/06* (2013.01); *Y10T 137/86035* (2015.04)
(58) Field of Classification Search
    CPC .................................. B09C 1/005; B09C 1/06
    USPC .............. 405/128.7, 128.8, 128.85; 209/370; 588/17
    See application file for complete search history.

(56) References Cited

U.S. PATENT DOCUMENTS

| 4,919,570 | A | * | 4/1990 | Payne .................. 405/128.7 |
| 5,067,852 | A |   | 11/1991 | Plunkett |
| 5,172,709 | A |   | 12/1992 | Eckhardt et al. |
| 5,213,445 | A |   | 5/1993 | Ikenberry et al. |
| 5,253,597 | A |   | 10/1993 | Swanstrom et al. |
| 5,325,795 | A | * | 7/1994 | Nelson et al. ............ 110/236 |

(Continued)

FOREIGN PATENT DOCUMENTS

| CA | 2312759 A1 | 6/1999 |
| CA | 2507752 A1 | 6/2004 |
| EP | 0557623 A2 | 9/1993 |

OTHER PUBLICATIONS

Leister, More Than Just Hot Air, 2 pages, May 2008.

(Continued)

*Primary Examiner* — Anna M Momper
*Assistant Examiner* — Patrick F Lambe
(74) *Attorney, Agent, or Firm* — Goodwin Procter LLP

(57) ABSTRACT

The present invention generally pertains to treatment cells, systems and methods for rehabilitating and valorizing a soil. More specifically, the present invention relates to methods for removing volatile compounds from the contaminated soils. The methods and system generally make use of an openable and reclosable rigid enclosure capable of receiving and treating many tons of soils. According to the invention, heated air is circulated through the soil to allow volatilization of the contaminants which can then be captured and separated form the circulating air before the air is re-heated and re-circulated through the soil.

49 Claims, 11 Drawing Sheets

(56) References Cited

U.S. PATENT DOCUMENTS

| | | | | |
|---|---|---|---|---|
| 5,836,718 A * | 11/1998 | Price | | 405/128.8 |
| 6,000,882 A | 12/1999 | Bova et al. | | |
| 6,829,844 B2 * | 12/2004 | Brady et al. | | 34/381 |
| 6,881,009 B2 | 4/2005 | Stegemeier et al. | | |
| 7,534,926 B2 * | 5/2009 | Stegemeier | | B09C 1/00 |
| | | | | 588/253 |
| 2004/0064969 A1 | 4/2004 | Fout et al. | | |

OTHER PUBLICATIONS

Osbge, Oregon Geologist Examiner, 4 pages, Jul. 2008.

Dynalab Corp. "Plastic Properties of Polyvinylchloride (PVC)" [online] Retrieved from the Internet: <URL:http://www.dynalabcorp.com/technical_info_pvc.asp, [Retrieved on Jun. 23, 2015].

Reef Industries Inc. "Material Safety Data Sheet" [online] Apr. 1, 2013. Retrieved from the Internet<URL:http://www.buildsite.com/pdf/reef/Permalon-Ply-X-150-MSDSSDS-821944.pdf, [Retrieved on Jun. 23, 2015].

Elephants Forever "Role of Bull Elephant" Retrieved from the Internet: <URL:http://www.elephantsforever.co.za/elephants-faq.html, [Retrieved on Jun. 23, 2015].

* cited by examiner

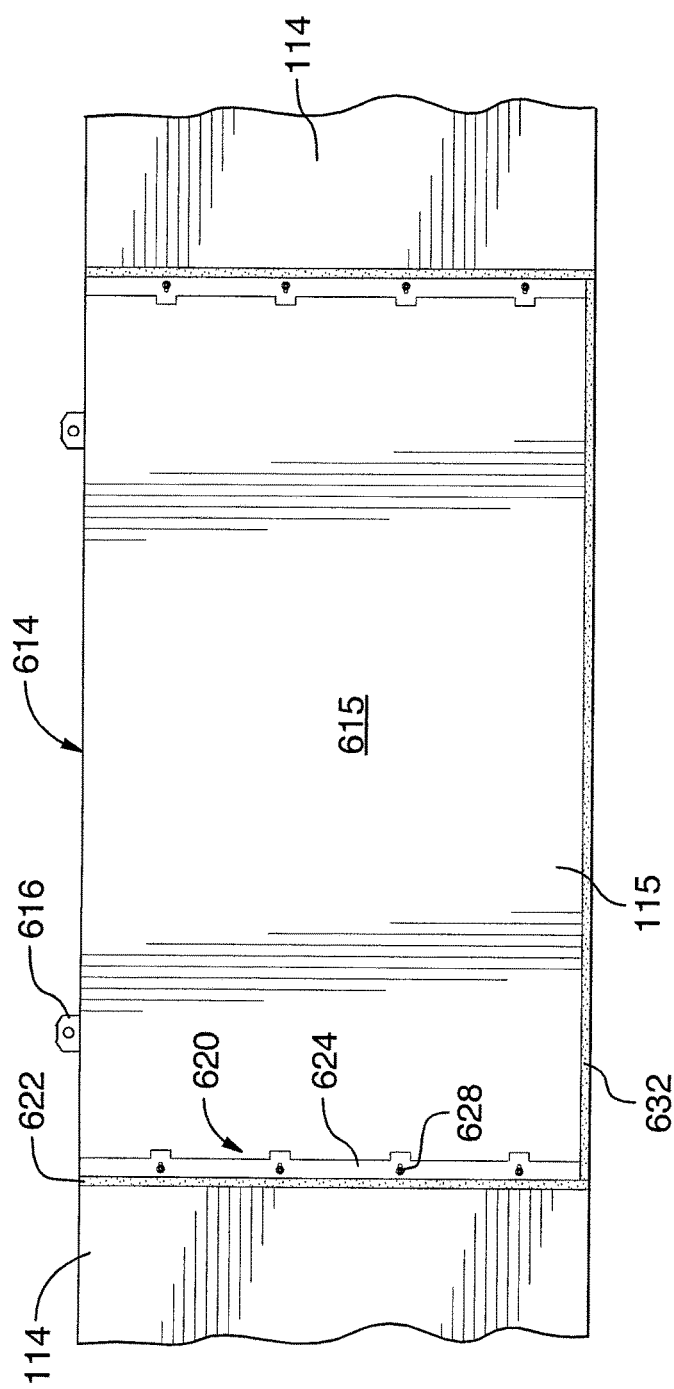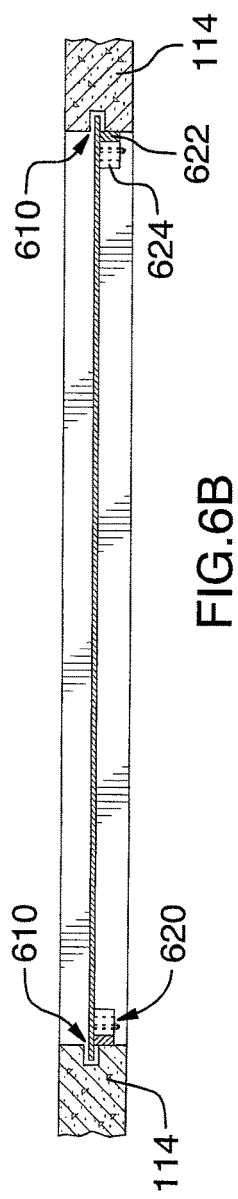
FIG.6A
FIG.6B

SYSTEMS, METHODS AND TREATMENT CELLS FOR REHABILITATING AND VALORIZING A SOIL

RELATED APPLICATION

The present application is related to U.S. provisional patent application US60/998,126 filed on Nov. 15, 2007, the content of which is incorporated herein by reference in its entirety.

FIELD OF THE INVENTION

The present invention generally relates to valorization, rehabilitation and decontamination of soils. More specifically, the present invention relates to treatment cells, systems and methods for removing one or more unwanted volatile compounds such as water or hydrocarbons contaminant that may be present in soils.

BACKGROUND OF THE INVENTION

Use of hydrocarbons as fuel for vehicles or plant operations (e.g. for heating systems, furnaces, burner and the like) involves extraction, refining, transport and storage of gas, diesel and other hydrocarbons typically known as being volatile. Because numerous steps are involved from the extraction to the final use of these volatile hydrocarbons, incidental or unintentional spillage often occurs, thereby leading to contamination of soils surrounding the sites where these fuel production steps are carried out. As existing environment legislation generally prohibit disposal of hazardous materials, soils and sludges contaminated by hydrocarbon fuels have to undergo decontamination steps to remove hydrocarbons for compliance with pollution restrictions and disposal.

Technologies for decontaminating soils and sludges are known in the art and can be broadly regrouped into three (3) categories namely bio-treatment, wash out and thermal treatment. Bio-treatment of contaminated soils typically consist in adding cellulose material such as wood chips or straw to adjust the moisture content of the substrate or soil, as well as feeding the same in nutriments and oxygen to encourage bacterial activity to thereby eliminate contaminants. Together with the fact that bio-treated soils tend not to be fully decontaminated, the use of cellulose additives contributes to make the decontaminated soils difficult to recycle as residential or commercial construction materials. As a consequence, bio-treated soils are generally disposed of in landfills. Further, bio-treatment of contaminated soils tends to be a very long process, requiring generally between three (3) and nine (9) months to reach an environmentally acceptable hydrocarbon content, and is associated with microbial production of significant amounts of the greenhouse gas carbon dioxide ($CO_2$).

Wash out processes generally involve using a chemical surfactant solution for leaching or washing the contaminants into the aqueous matrix of the soil, collecting the contaminated aqueous matrix and treating the same. The contaminated liquid fraction is collected and itself submitted to treatment or decontamination steps. In addition to requiring substantial amount of expensive chemicals, wash out processes require specialized equipment such as sealed thanks water treatment systems. Wash out processes also tend to be of limited efficacy, see useless, where the soil to be treated includes fine particles (e.g. with clays and silteous soils). Further, soils decontaminated according to these processes tend to become water-saturated and are therefore of a limited use as construction material, especially when fine particles are present, such fine particles generally requiring further decontamination steps. Finally, because it is generally not possible to prevent evaporation of the solvents use for leaching the contaminants from the soil, recuperation and incineration thereof is often necessary, which also results in production of significant amounts of $CO_2$.

Thermal treatments of contaminated soils may alleviate some drawbacks associated with bio-treatments and wash out processes since they tend to be suitable for most types of soils and generally permit complete decontamination of the treated soils. Thermal treatments include pyrolysis, incineration and thermal desorption.

Incineration requires heating large amounts of soils to very high temperatures, i.e. from 400° C. to 1,000° C., to decompose even small amounts of contaminants. As such, incineration tends to be energy inefficient and consequently uneconomical. Pyrolysis is also a process by which contaminated soils are also exposed to very high temperature, with the exception that, the process is carried out in absence of oxygen. Similarly to incineration, pyrolysis involves high energy consumption and tends to be costly. Both technologies are however associated with production of $CO_2$, and do not allow recycling of the treated soils as construction materials, causing them to be less interesting on an environmental standpoint.

Thermal desorption involves heating the contaminated soil under oxygen concentration and residence time to enable volatilization and separation of the contaminants from the soil while avoiding their thermal degradation. A number of in situ decontamination technologies have been reported in the art. In situ desorption technologies typically involve drilling a plurality of wells or holes on the contaminated site, inducing a flow of heated air in the drilled wells to force volatilization of the contaminants and collecting the volatilized contaminants at the surface of the soil for further treatment thereof. The in situ desorption technologies known in the art tend to be expensive, most of the time ineffective and to require substantial amount of time (i.e. from 6 to 18 months) to reach acceptable decontamination level. Further, due to the difficulty to efficiently collect the volatilized contaminants, in situ technologies may result in contaminant escaping the collection systems and to remain in the atmosphere.

To alleviate the drawbacks associated to in situ technologies, some have proposed thermal desorption technologies carried off the contamination site, also know as ex situ thermal desorption. Ex situ desorption technologies typically involve excavation and transport of the contaminated soil to a treatment facility. Once at the treatment facility, the contaminated soil is placed in a treatment stockpile where a flow of heated air is circulated through the contaminated soil to volatilize the contaminant. The volatilize contaminant is collected and further treated.

Examples of such ex situ technologies are described in U.S. Pat. No. 5,067,852 to Plunkett (the '852 Patent), U.S. Pat. No. 5,836,718 to Price (the '718 Patent) and U.S. Pat No. 5,213,445 to Ikenberry (the '445 Patent). The '852 and '445 Patents both disclose methods and systems for removing contaminants from a soil by volatilization. The systems taught in these patents make use of pipe arrays embedded in a stockpile, which stockpile is further covered with flexible air-impermeable membranes or liners. The '852 and '445 Patents both make use of vacuum to encourage volatilization whereas the '718 patent uses hot pipes. According to some, these technologies would have been proven to be ineffective for effecting decontamination because of the low temperatures used to carry out the process without damaging the sealing members. Because the pipe arrays and/or membranes have to be dissembled or removed between batches of soil to be treated, those systems are not convenient.

Other example of ex situ technologies are described in U.S. Pat. No. 5,253,597 to Swanstrom et al. (the '597 Patent) and U.S. Pat No. 6,000,882 to Bova and Richter (the '882 Patent). These two patents describe methods and systems for causing volatilization of contaminants from a soil, where very high temperature and/or negative pressure (i.e. vacuum) are required to carry out the methods. As such, equipment must be adapted to sustain rigorous operating conditions and the systems tend not to be economical. An additional example of ex situ technologies is described in U.S. Pat. No. 6,881,009 to Stegemeir, this system using electrical resistance heater elements to heat the soil to be treated.

Further, the technologies described in the '852, '718, '445 '597 and '882 Patents, tend to be impractical or non convenient for treating large amounts of contaminated soils, either because de configuration of the vessels receiving the soil to be treated does not enable receiving large volume of soil or because re-used of the system require disassembly of the pipe arrays.

It would therefore be advantageous to be provided with an improved energy efficient system for treating contaminated soils ex situ. More preferably, such a system would allow sequential treatment of large volumes of contaminated soils without the need to dismantle substantial components thereof.

SUMMARY OF THE INVENTION

In order to address the above and other drawbacks, and in accordance with the present invention, there is disclosed systems, methods and treatment cells for removing unwanted volatile compound(s) from soil and thereby valorizing and rehabilitating such soil. The volatile compound may be for instance water or a hydrocarbon contaminant, including but not limited to gasoline, diesel, jet fuel, heating fuel, liquefied petroleum gas, oils, petroleum derivatives and mixtures thereof.

According to one aspect, the invention relates to a treatment cell for removing one or more unwanted volatile compounds from a heap of soil. In one embodiment, the treatment cell comprises (1) an openable and reclosable rigid enclosure adapted for receiving the heap of soil; and (2) an air intake and an air exhaust operatively connected to the enclosure, the air intake and the air exhaust being configured and positioned to circulate hot air through the heap of soil. The treatment cell is substantially air-tight in order to create therein a negative pressure when operatively connected to a vacuum pump. Preferably, the air intake and the air exhaust are spaced-apart for maximizing diffusion of hot air from the air intake to the air exhaust through said heap of soil. Preferably, the enclosure is sized and configured for receiving at least 200 tons of soil (200 000 kg).

In one embodiment the air intake is fixedly connected to a bottom portion of the enclosure whereas the air uptake is fixedly connected to a cover removably mounted to an upper portion of the enclosure. More particularly, the air intake may comprise a plurality of perforated distribution pipes resting on and spreading over a substantially large area of a bottom portion of the enclosure. Similarly, the air exhaust may comprise a plurality of perforated collection pipes spreading over a substantially large area of an upper portion of the enclosure.

In one preferred embodiment, the treatment cell is substantially air-tight and it is integral to a closed-loop system. Such closed-loop system may comprise a pump and heating means both operatively connected to the air intake of the cell for introducing hot air into the enclosure. The closed-loop system may further comprise a treatment unit operatively connected to the air exhaust of the cell for removing compounds volatilized from the heap of soil.

According to one particular embodiment, the treatment cell of the invention comprises an openable, reclosable and substantially air-tight rigid enclosure shaped and sized for receiving therein at least 200 tons of soil (200 000 kg), the enclosure cell being adapted for fixedly mounting thereto (i) an air intake for injecting hot air into the enclosure and (ii) an air exhaust for collecting air having been injected by the air intake and having circulated through the heap of soil.

The invention also relates to a method for removing one or more unwanted volatile compounds from a heap of soil, the method comprising the steps of:
placing the heap of soil within an openable, reclosable and substantially air-tight rigid enclosure; and
creating a negative pressure inside the rigid enclosure and circulating heated air through the heap of soil to gradually increase the temperature of the soil to a temperature allowing volatilization out from the soil of at least a portion of the volatile compounds.

The method of the invention may further comprises the steps of collecting air having circulated through said heap of soil and removing therefrom said volatilized compound. Further, the method may comprise the steps of re-heating air collected and recirculating the reheated air through the heap of soil. In one embodiment, the heated air is introduced into the enclosure at a temperature of about 150° C. to about 200° C.

In another embodiment, the method for removing one or more unwanted volatile compounds from a heap of soil comprises the steps of:
(a) placing the heap soil into a treatment cell as described herein;
(b) circulating a volume of heated air through the heap of soil to gradually increase the temperature thereof for reaching a temperature sufficient to allow volatilization out from the soil of a at least a portion of the volatile compound;
(c) collecting heated air of step (b) comprising a volatile compound volatilized therein;
(d) separating at least a portion of the volatilized compound from the air collected;
(e) re-heating air of step (d); and
(f) introducing the re-heated air of step (e) into the treatment cell for re-circulation through the heap of soil.

Steps (b) to (f) of the method may be repeated until the volatile compounds have been substantially completely removed from the heap of soil. In accordance with another embodiment, steps (b) to (f) may repeated until humidity in the soil is about 0.1% to about 5%, preferably about 1% to 3%.

The invention also relates to a closed-loop system for removing one or more unwanted volatile compounds from a heap of soil. In one embodiment the closed-loop system comprises:

an openable, reclosable and substantially air-tight rigid enclosure shaped and sized for receiving the heap of soil;

an air intake operatively connected to the enclosure for injecting heated air into the heap of soil and an air exhaust operatively connected to the enclosure for collecting heated air having circulated through the heap of soil, the air intake and the air exhaust being both fixedly mounted to the enclosure;

a vacuum pump operatively connected to the air intake and the air exhaust for circulating heated air through the closed-loop system and for creating a negative pressure inside the rigid enclosure;

heating means operatively connected to the pump for providing heated air to be circulated through the heap of soil; and a treatment unit operatively connected to the air exhaust and to the heating means for removing volatilized compounds collected by the air exhaust.

In accordance with such closed-loop system, the air intake and the air exhaust are preferably spaced-apart from each other for maximizing diffusion of hot air from the air intake to the air exhaust through the heap of soil. The air intake may further comprises a plurality of perforated distribution pipes spreading over a substantially large area at a bottom portion of the cell under the heap of soil. Similarly, the air exhaust may comprises a plurality of perforated collection pipes spreading over a substantially large area at an upper portion of the cell above the heap of soil.

With the system of the invention, circulation of heated air through the heap of soil gradually increase the temperature of the soil to a temperature allowing volatilization out from the soil of a at least a portion of the volatile compounds contained therein. In one embodiment, the closed-loop system comprises a plurality of substantially air-tight cells each adapted to receive at least 200 tons of soil (200 000 kg).

In accordance with another embodiment, a closed-loop system according to the invention includes a rigid and substantially air-tight cell adapted for receiving the heap of soil therein. Fixedly mounted to the cell are an air intake for introducing a volume of air through the heap of soil and an air exhaust, spaced-apart from the air intake, for collecting the air from the heap. The system also includes a burner operatively connected to the air intake for heating the volume of air prior to being introduced through the heap of soil. The introduction of the hot air through the heap of soil causes the same to gradually reach a temperature sufficient for allowing volatilization of undesirable volatile compounds. The system also includes a treatment unit and a pump. The treatment unit is operatively connected to the air exhaust and to the burner for separating, at least partially, the volatilized compounds from the collected air prior to reheating the same. The pump is operatively connected to the air intake and the air exhaust for encouraging the volume of air to circulate through the closed-loop system.

The invention further relates to an industrial installation for decontaminating soils, that industrial installation comprising a plurality of treatment cells as defined herein operatively connected together in a closed loop system, that industrial installation being capable of decontaminating at least 200 tons of soils (200 000 kg) on a daily basis.

These and other objects, advantages and features of the present invention will become more apparent to those skilled in the art upon reading the details of the invention more fully set forth below.

BRIEF DESCRIPTION OF THE DRAWINGS

Having thus generally described the nature of the invention, reference will now be made to the accompanying drawings, showing by way of illustration an illustrative embodiment thereof, and in which:

FIG. 6A is a partial front elevation view of a front wall with a removable door in accordance with one embodiment of a treatment cell of the present invention, FIG. 6B is top elevation view of the front wall and removable door shown in FIG. 6A.

DESCRIPTION OF THE ILLUSTRATIVE EMBODIMENTS

Figure 1:
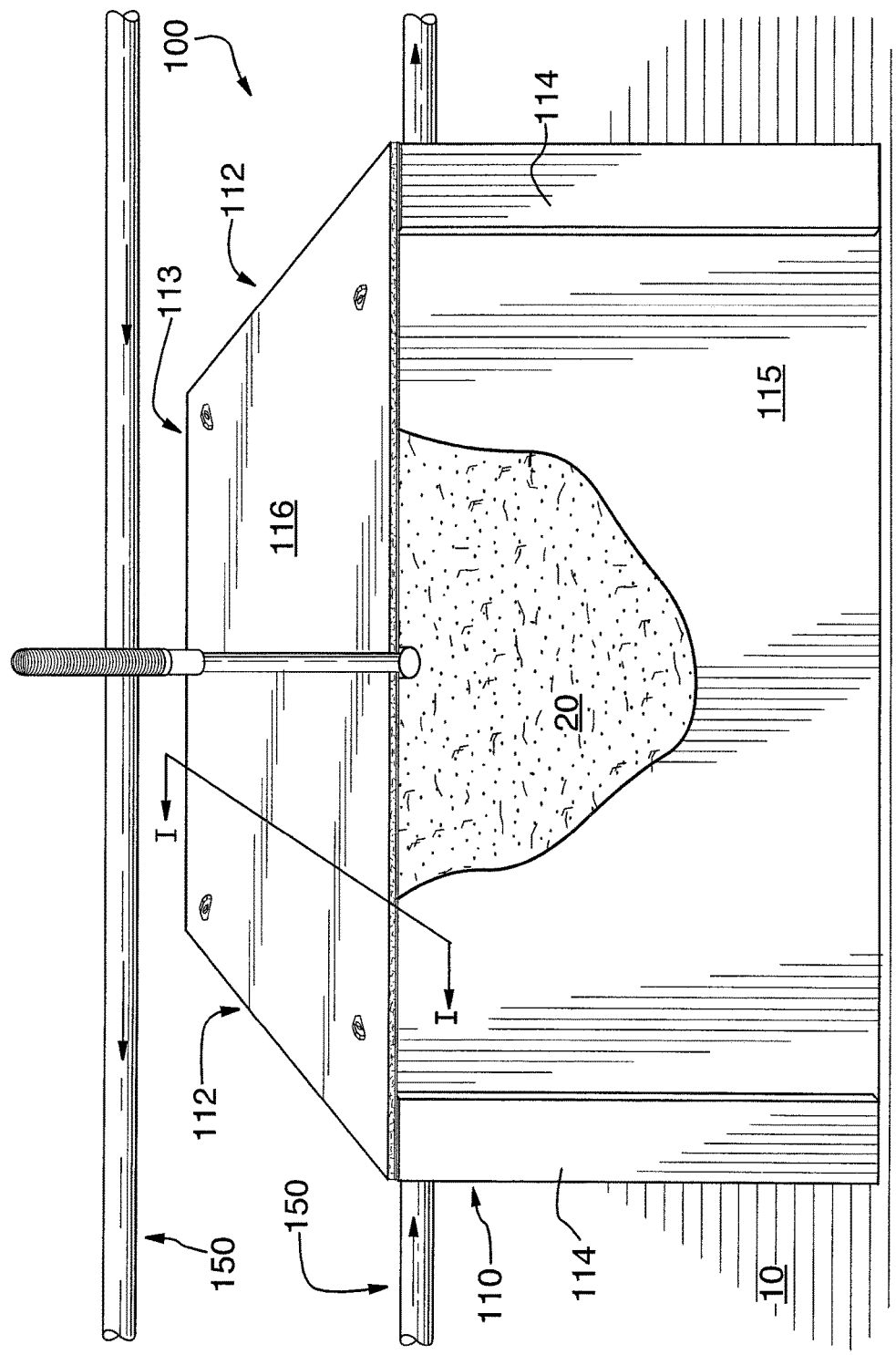
FIG. 1 is a top perspective partly sectioned front view of a treatment cell, filled with large quantities of soil, in accordance with one embodiment of the present invention.

The description which follows, and the embodiments described therein are provided by way of illustration of an example, or examples of particular embodiments of principles and aspects of the present invention. These examples are provided for the purpose of explanation and not of limitation, of those principles of the invention. In the description that follows, like parts are marked throughout the specification and the drawings with the same respective reference numerals.

The present invention is based on fundamental principles of thermodynamic and generally consists in heating a soil contaminated with one or more undesirable volatile compounds by continuously providing a stream of hot air through the soil, whereby the circulating hot air allows heating and drying the matrix of the soil. Such heating will gradually increase the temperature of the soil to a temperature allowing volatilization and removal of at least a portion of, and eventually all, humidity and volatile contaminants compounds out from the soil. The volatile contaminant may consist for instance of hydrocarbon contaminants such as gasoline, diesel, jet fuel, heating fuel, oils, liquefied petroleum gas and other petroleum derivatives. It is understood that the term "unwanted volatile compound" as intended herein encompasses water particles, hydrocarbon contaminants and mixtures thereof. A person skilled in the art will appreciate that the invention may find use with many other compounds susceptible of volatilization under suitable operating conditions.

Because water is a volatile compound the invention may also be used to reduce the moisture content of a soil, whether contaminated or not, to further facilitate screening of the various components thereof. In other words, because water is a volatile compound, the invention can be used for drying a soil until a desired dryness thereof is reached. For instance, a soil partially or fully dried according to the processes and methods of the invention can be more suitable for undergoing screening steps to separate gravel, sand and fine particles. In this example, gravel and sand can be recycled into construction components such as for road construction or concrete preparation. Because fine particles tend to accumulate more contaminants than other soil components (e.g. sand and gravel), very often further decontamination steps can only be applied to such fine particles once screening of the soil has been carried out. Examples of contaminants that can be found in such fine particles include, for instance, heavy metals, heavy hydrocarbons, PCBs, and asbestos. Therefore, drying of the soil with the invention may facilitate screening thereof, thereby considerably reducing the volume of soil material required to undergo further decontamination steps and minimizing costs associated with removal of such contaminants.

According to the invention, unwanted volatile compound are removed from the soils by using a treatment cell dedicated for that particular purpose. With reference to FIGS. 1 to 6, a preferred embodiment a treatment cell 100 for removing unwanted volatile compounds is shown. FIG. 1 shows that the treatment cell 100 comprises an openable and reclosable rigid enclosure 110 that has been build above the ground 10 and filled with soil 20. The enclosure 110 comprises two side walls 112, a back wall 113 and a front wall 114 comprising a removable door 115. Preferably, the walls 112, 113, 114 define an integral rigid structure. The enclosure 110 further comprises a cover 116. Preferably, the cover 116 is removable and it is adapted to tightly sit on top of the walls 112, 113, 114. On can appreciate that the treatment cell 100 illustrated in FIG. 1 forms a rigid and permanent enclosure 110 shaped and sized for receiving large quantities of soil 20. As it will be explained with more details hereinafter, in operation, the treatment cell 100 is connected to a hot air pipe assembly 150 for circulating hot air through the soil 20. Therefore, the enclosure 110 is preferably substantially airtight.

Figure 2:
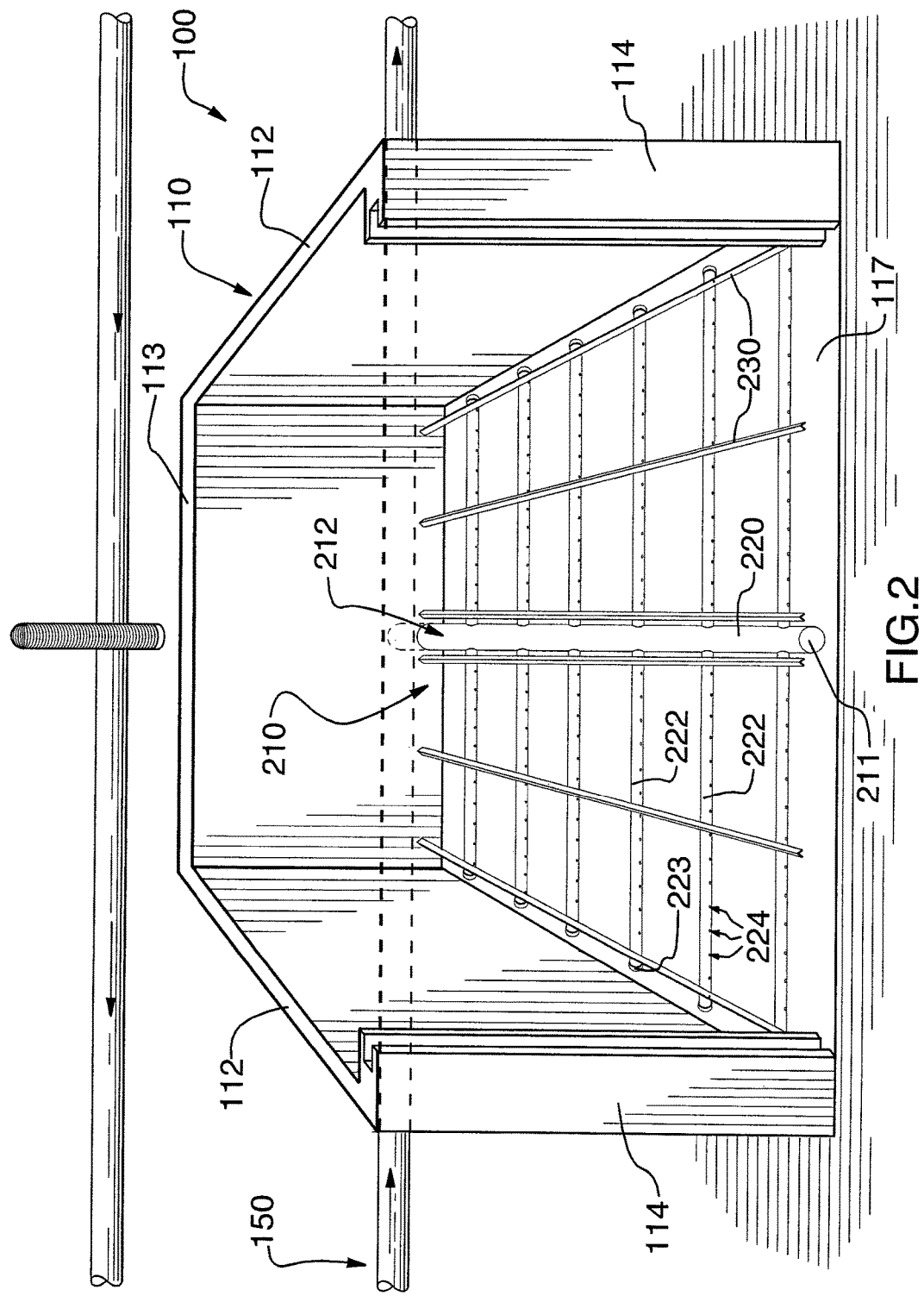
FIG. 2 is a top perspective front view of an empty treatment cell according to FIG. 1, with the door and the cover removed for showing pipes and rails at the bottom of the cell.

FIG. 2 shows inside an empty treatment cell 100. One can appreciate that the side walls 112, the back wall 113 and the front wall 114 are mounted on a base 117. Preferably, to minimize air leaks, the base 117 and the walls 112, 113, 115 define an integral structure. The base 117 and the walls 112, 113, 115 are strong enough to support and contains tons soil. Accordingly, they are preferably made from reinforced concrete and they preferably have a thickness of at least 20 centimeters. It will be appreciated by a person skilled in the art that the base 117 and the walls 112, 113, 115 can be cast directly on the treatment site (i.e. onsite). Alternatively, these components could be cast offsite and transported separately to the treatment site or transported as a single, integral assembly. A person skilled in the art will further appreciate that various materials could be used for the purpose of building the base 117 and the walls 112, 113, 114 such as, for instance, metal panels and that such panels can be mounted to one another onsite.

In one embodiment, the enclosure 110 has an internal volume of about 140 m$^3$. More specifically, the cell 100 has an internal an internal width of 6.7 m (22 feet), an internal depth of 7.6 m (25 feet) and an internal height of 3.0 m (10 feet). Such an enclosure is capable to receive about 180 to about 250 tons of soil (180 000 to about 250 000 kg).

As shown in FIG. 2, the treatment cell 100 further comprises an air intake 210 for injecting hot air into the treatment cell 100. The air intake 210 is connected to the hot air pipe assembly 150 and it is the configured and positioned to maximize circulation of hot air through soil contained in the enclosure 110. According to this particular embodiment the air intake 210 generally defines a ribcage structure and comprises a main inlet pipe 220 and a plurality of secondary distribution pipes 222 extending perpendicularly therefrom. In this embodiment the main inlet pipe 220 comprises a closed front end 211 and an open back end 212, the latter extending through the back wall 113 to connect to the hot air pipe assembly 150. The main inlet pipe 220 and the distribution pipes 222 sit on the base 117 and they are spreading over a substantially large area thereof to maximize uniform distribution of hot air inside the treatment cell 100. The main inlet pipe 220 and the distribution pipes 222 are made of a rigid and heat resistant material (e.g. steel or stainless). Those pipes 220, 222 may simply sit on the base 117 or may be fixedly connected thereto. Each distribution pipe 222 comprises a plurality of perforations 224 defining corresponding injection sites of hot air. The distribution pipes 222 may also comprise a removable end cap 223 for facilitating removal of debris inside the pipes 222. Preferably, these perforations 224 are oriented toward the base 117 in order to minimize clogging by the soil and to inject hot air in a direction opposite from an air exhaust which, in this particular embodiment, is located in the cover 116 (see FIG. 5). In one particular embodiment, the main inlet pipe 220 has a diameter of about 25 centimeters (about 10 inches) and the distribution pipes 222 have a diameter about 10 centimeters (about 4 inches). In one embodiment, the perforations 224 (424 have a diameter of about 19 mm (¾ inch). The main inlet pipe 220 and the distribution pipes 222 are in open communication with each other and with inlet sections of with the hot air pipe assembly 150.

Figure 3:
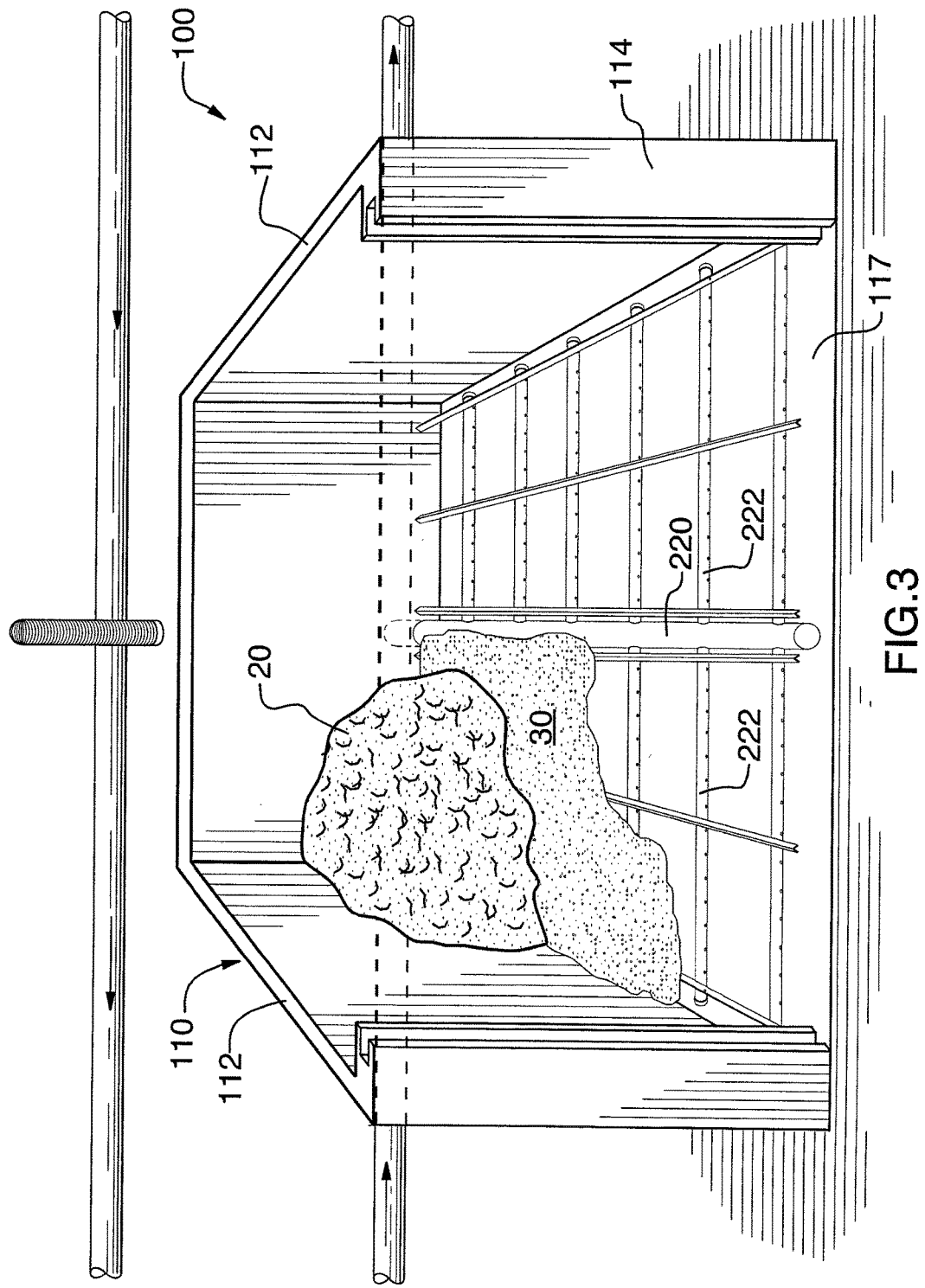
FIG. 3 is a top perspective front view of the treatment cell shown in FIG. 2, showing the pipes and rails partially covered with a bed of an inert material.

In the illustrated embodiment shown in FIG. 2, the treatment cell 100 further comprise a array of rails 230 extending over the inlet pipe 210 and distribution pipes 222. The rails 230 are fixedly mounted to the pipes 220, 222 (e.g. welded to a top portion thereof or by using rivets, screws, nuts and bolts and the like). As shown in FIG. 3, in the course of normal operation and in accordance to one particular embodiment of the present invention, the pipes 220, 222 and the rails 230 are embedded in a bed of an inert material 30 (e.g. gravel, small rocks, etc.), that material being selected for allowing circulation of hot air while minimizing clogging of the perforations 224. The embedment 30 is thus helpful in preventing, or at least minimizing, clogging of the perforations 224 of the distribution pipes 222 when the treatment cell 100 is filled with the contaminated soil. The embedment 30 and the rails 230 are also useful for protecting the pipes 220, 222 from being crushed heavy mechanical equipment (e.g. tractor, loader, truck, etc.). The rails 230 further provides a sliding platform for convenient conveyance of soil in and out of the treatment cell 100 when using a loader. Preferably, the embedment 30 is made of gravel having a diameter ranging between about 5 mm to about 20 mm, such the embedment 30 being preferably about 100 to about 200 mm thick (i.e. distance from the base 117 to the top of the rails 230).

Figure 4:
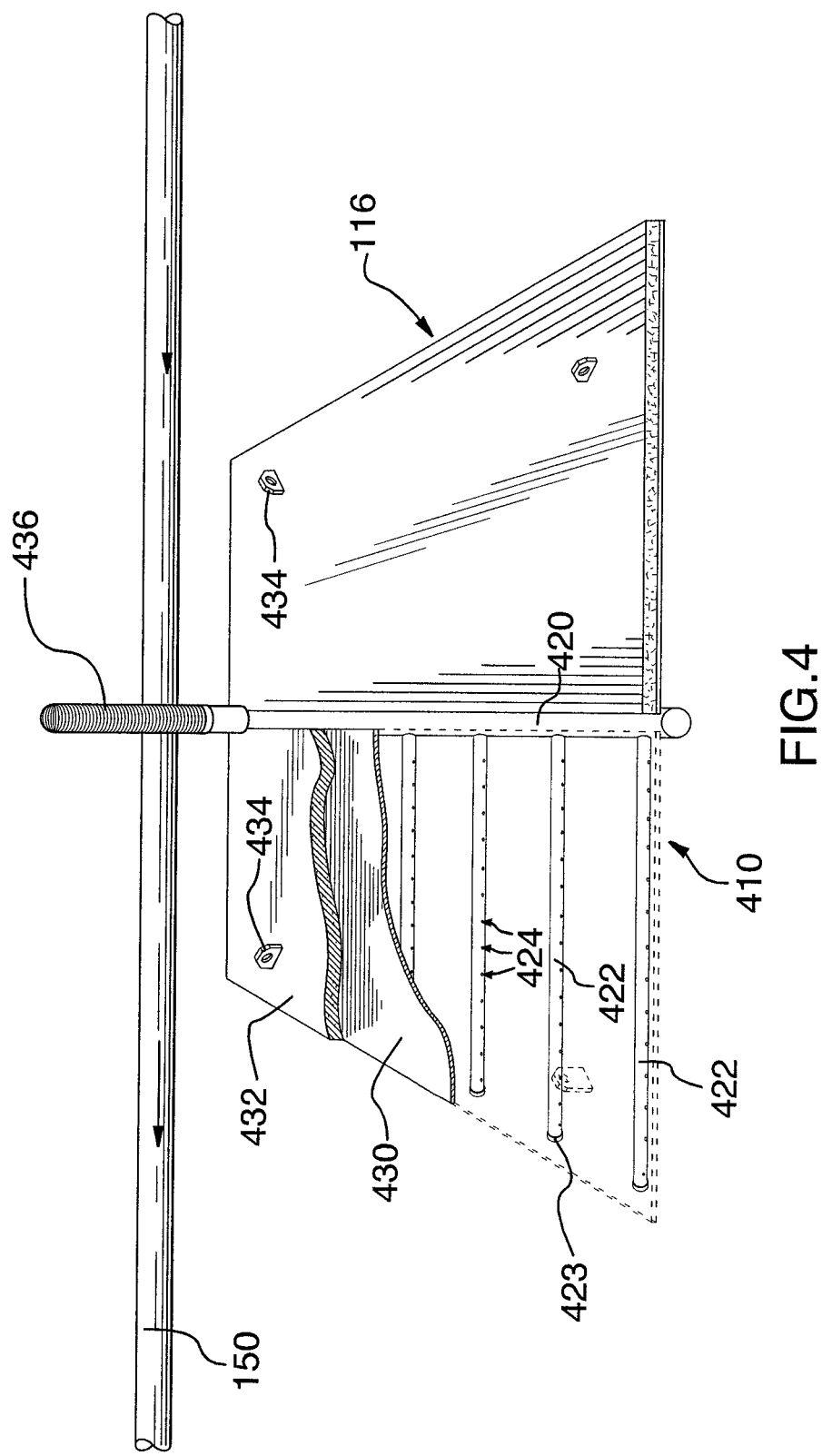
FIG. 4 is a top perspective partly sectioned front view, of a removable cover in accordance with one embodiment a treatment cell of the present invention.

As indicated hereinbefore, according to this particular embodiment, the enclosure 110 further comprises a removable cover 116 which is mounted on the top of the walls 112, 113, 114 and of the door 115 (see FIG. 1). Referring now more particularly to FIG. 4, in one embodiment the cover 116 is provided with an exhaust pipe array 410 for collecting hot air injected into the treatment cell and directing that air into the hot air pipe assembly 150. The exhaust pipe array 410 comprises a main outlet pipe 420 and a plurality of secondary collection pipes 422 extending perpendicularly therefrom. Each collection pipe 422 comprises a plurality of perforations 424 defining corresponding collection sites of hot air. The collection pipes 422 may also comprise a removable end cap 423 for facilitating removal of debris inside the pipes 422. The cover 116 further comprises a rigid pane 430 to which the pipes 420, 422 are fixedly mounted to (e.g. welded or by using rivets, screws, nuts and bolts and the like). Preferably the cover further comprises a layer of an insulating material 432 (e.g. foam or fiber glass contained within two panes of aluminum) for minimizing loss of heat from inside the treatment cell.

In one embodiment, the cover 116 is adapted be removed and from and put back onto the enclosure 110 in order to facilitate filling and emptying of the treatment cell 100. In an alternate embodiment, the cover 116 is fixedly mounted to structure and integral to the walls. The removable cover 116 shown in FIG. 4 comprises a plurality of hooks 434 fixedly mounted to the pane 430 and extending through the isolating material 432, the hooks 434 providing means for manipulating the cover 116 using heavy equipment (e.g. lifting and reinstalling the cover 116 using, for instance, an excavator). The removable cover 116 shown in FIG. 4 further preferably comprises a flexible tube 436 in open communication with the exhaust pipe 420 and the hot air pipe assembly 150.

The cover 116 is preferably sized and configured to fit tightly on top of the enclosure 110. Although not shown, an upper edge portion of the walls 112, 113, 114 may be provided with recesses or notches for sitting the cover therein. Alternatively, a support could be mounted to the walls 112, 113, 114 inside the enclosure 110. A person skilled in the art will acknowledge that the cover 116 can be mounted in a number of different ways above or within the walls 112, 113, 114 of the cell 100. The cover 116 may further comprises at its outer edges sealing means (e.g. foam, rubber, etc.) for providing air-tightness to the treatment cell 100.

Those skilled in the art will appreciate that rigidity of the cover 116 is provided by the rigid pane 430 and the exhaust pipes 420, 422 fixedly mounted thereto. As such, it will be appreciated that the diameter, thickness, length, material and means for assembling the pipes 420, 422 are adapted to provide sufficient rigidity or stiffness to the cover 116. The main exhaust pipe 420 and collection pipes 422 are preferably made of a rigid and heat resistant material (e.g. stainless steel, metal). In one embodiment, the main exhaust pipe 420 is a metal pipe having a diameter ranging from about 10 cm to about 40 cm (about 4 inches to about 16 inches), and a length that generally corresponds to the distance separating the front 114 wall and back wall 113. The diameter of the collection pipes 422 is smaller than the diameter of the main exhaust pipe 420 and preferably ranges between about 5 cm to about 15 cm (about 2 to 6 inches), and is more preferably about 10 cm diameter (about 4 inches).

Figure 5:
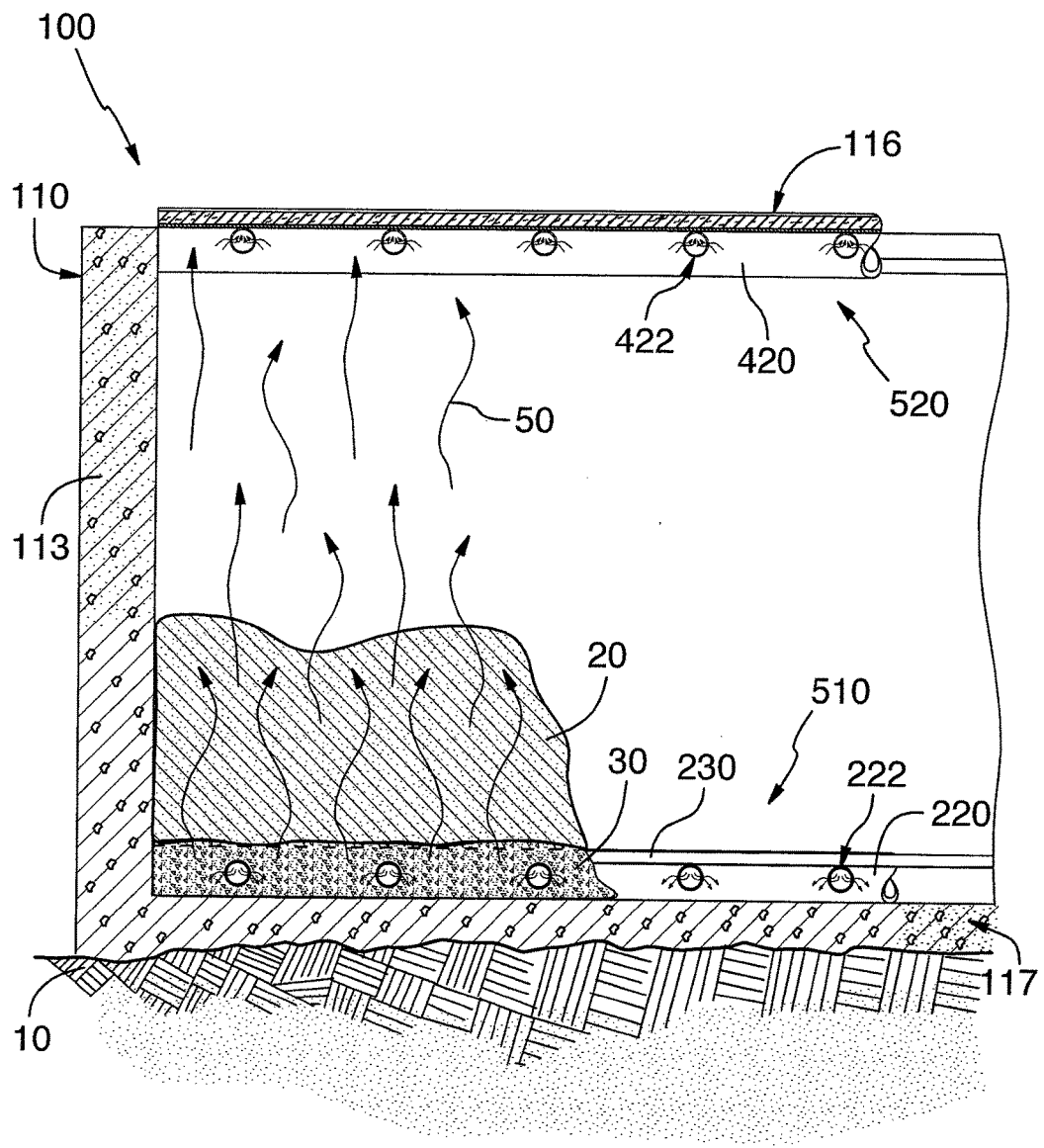
FIG. 5 is a cross-section view of the treatment cell taken along line I-I FIG. 1.

As shown in FIG. 5, the treatment cell 100 is configured such that, during normal operation, the exhaust pipes 420, 422 are vertically spaced-apart from the inlet pipes 220, 222. Such configuration provides plenty of empty space allowing soil 20 to be accommodated between an air intake region 510 and an air exhaust region 520 of the treatment cell 100. Such distance is also beneficial for maximizing diffusion of hot air 50 from the to the air intake region 510 through the soil 20 to air exhaust region 520 when the treatment cell 100 is filled. Circulating heated air through the soil 20 will gradually increase its temperature to a point where at least a portion of the volatile compounds or contaminants contained into to the soil 20 will volatilized out from the soil 20. Volatized compounds or contaminants will then be captured by the collection pipes 422 and circulated to the pipe array assembly to be further treated by a treatment assembly as it will be explained with more details hereinafter. After a certain period, all volatile compounds will have volatilized and been removed from the soil 20.

As indicated hereinbefore, the rigid enclosure 110 is adapted for receiving large quantities of soil and thus it preferably comprises an opening for allowing transport of soil in and out the treatment cell 100. Such opening is preferably sized and positioned on the front wall 114 to allow of heavy equipment such as front loaders, heavy trucks and the like to circulate in and out of the treatment cell 100 when filling the same with untreated soil or when collecting treated soil upon completion of the volatilization or decontamination process. For instance, a suitable opening can be rectangular and be about 4.3 m wide (14 feet) and about 2.4 m (8 feet) high.

According to a particular embodiment, the enclosure 110 further comprises a removable door 115. Referring now more particularly to the embodiment illustrated in FIGS. 6A and 6B the door is adapted for downwardly sliding into C-shaped slots 610 extending vertically into left and right side sections of the front wall 114. The door 115 comprises a rigid panel 615 and a pair of rings 616 mounted to the top edge 614 of the door 115 for attaching chains, ropes and the like. Accordingly, it is possible to use heaving equipment such as a front loader or an excavator to slide the door 115 in and out of the front wall 114. Although not shown, a C-shaped metal beam could be mounted inside each slot 610 for preventing direct contact of the door 115 with the concrete material of the front wall 114, thereby minimizing wear to the front wall 114 that may be caused by repetitively removing and repositioning the door 115. In one alternate configuration, the door 115 could be adapted to be slid in and out the seat using hydraulic actuators connected to the door and to the front wall 114 for instance. The door could also be mounted on hinges fixed to left or right side sections of the front wall 114. A person skilled in the art will acknowledge that numerous possibilities exist for configuring the enclosure 110 such that it comprises a suitable opening, and more particularly for configuring, placing and removing a door in accordance with the embodiments of the present invention.

For maximizing an airtight fit of the door 115 with the front wall 114, the door 115 preferably comprises sealing means 620. The sealing means 620 illustrated in FIGS. 6A and 6B are removably connected to the exterior side of the rigid panel 615. The sealing means 620 extend vertically on outer edges of the door 115 and comprises an air-tight material 622 (e.g. foam, rubber, etc.) which is squeezed between the rigid panel 615 and the left or right side sections of the front wall 114 by using an elongated blocking piece 624 (e.g. metal, wood, etc.). The elongated blocking piece 624 can fixed and unfixed to the rigid panel 615 using a plurality of fixing members 628 (e.g. bolts, screws, etc). It may also be preferable to squeeze similar air-tight sealing materials 632 under the door 115.

The sealing means 620 extend vertically on outer edges of the door 115 and comprises an air-tight material 622 (e.g. foam, rubber, etc.) which is squeezed between To further minimize air leaks from the treatment cell 100 and to isolate and/or reduce the heat exchange between the internal and external environment of the cell 100, the pipe assembly 150, the walls 113, 114, the door 115, the cover and 116 the base 117 may be covered by or coated with (inside or outside as more appropriate) an insulating material such as, for instance, aluminum, fiber glass, Styrofoam™, spray thermal insulation, combinations thereof and the like. A person skilled in the art will further appreciate that a series of enclosure 110 can be build together side-by-side in order to form an array of treatment cells 100 sharing some common walls. In other words, a cell array could have a configuration where the right side wall of one cell is also the left wall of an adjacent cell, thereby minimizing construction costs and also heat losses.

Figure 8:
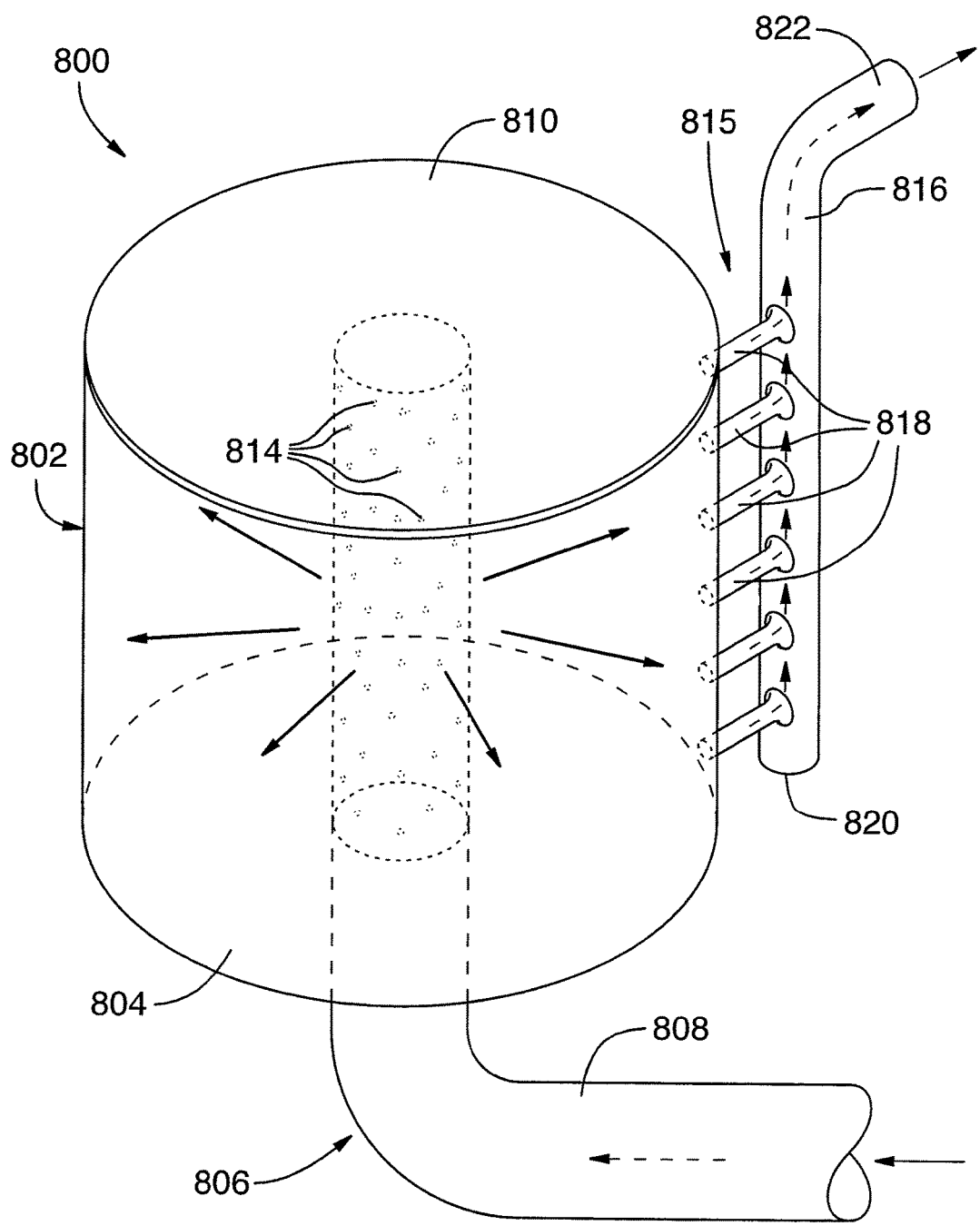
FIG. 8 is a top perspective view of a vertically extending cylindrical treatment cell in accordance with an alternative embodiment of the present invention.

It will be understood by a person skilled in the art that many other configurations of treatment cells are possible. For instance, a treatment cell in accordance with another embodiment having the general shape of a horizontal cylinder mounted for rotation is shown in FIG. 8 using the reference numeral 800. In one embodiment, the treatment cell 800 comprises a cylindrical side wall 802 extending vertically and upwardly from a circular bottom wall 804. Preferably, the cylindrical side wall 802 and the bottom wall 804 define an integral rigid structure. One skilled in the art will appreciate that such an integral structure forms an open-ended cylindrical enclosure adapted to receive soil therein. The treatment cell 800 further comprises a circular cover 810 adapted to removably sit on the cylindrical side wall 802. It will be appreciated that the removal of the cover 810 enables one to selectively provide the treatment cell 800 with soil therein and remove soil therefrom. The treatment cell 800 is further provided with an air intake 806 for injecting hot air into the treatment cell 800, the air intake 806 comprising an inlet pipe 808 extending through the bottom wall 804 into the cell 800 from a hot air assembly similar to the one described hereinbefore. The inlet pipe is provided with a plurality of perforations 814 for radially injecting hot air through soil provided in the treatment cell 800. The treatment cells 800 further comprises an air exhaust assembly 815 comprising a main exhaust pipe 816 wherefrom perpendicularly extend a plurality of secondary collection pipes 818 connected to the side wall 802 of the cell 800.

Figure 9A:
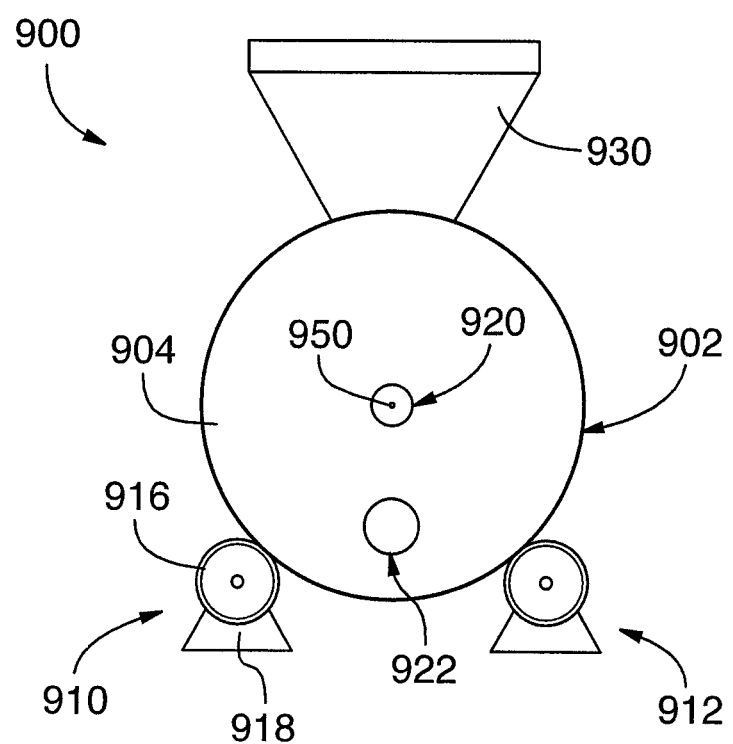
FIG. 9A is a front elevation view of a horizontally extending cylindrical treatment cell in accordance with another embodiment of the present invention.
Figure 9B:
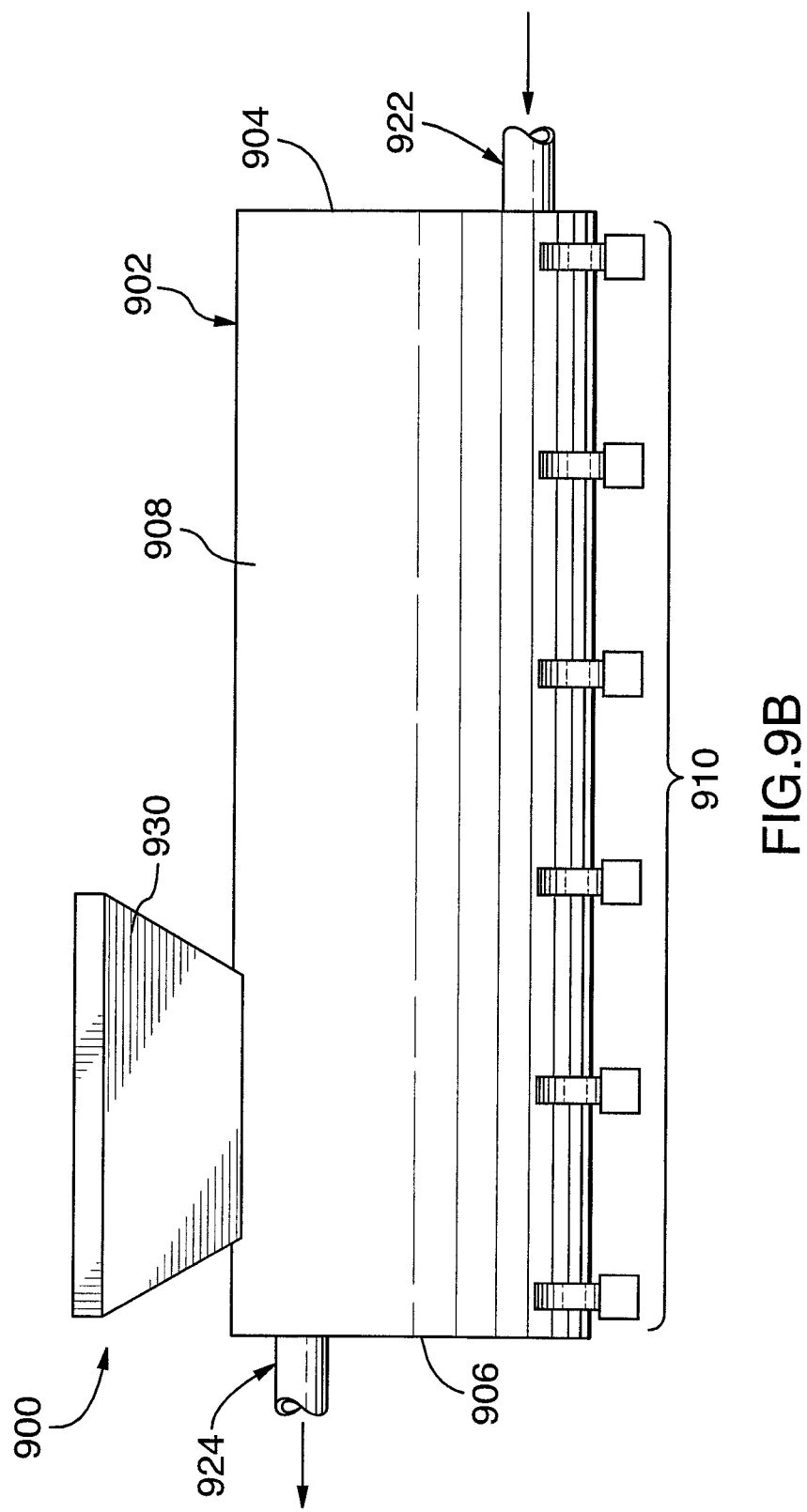
FIG. 9B is a left side elevation view of the horizontal cylindrical treatment cell shown in FIG. 9A.

Yet another embodiment for a treatment cell, referenced to using the numeral 900, is shown in FIGS. 9A and 9B. Such a treatment cell 900 comprises a cylindrical enclosure 902 positioned substantially horizontally, the cylindrical enclosure 902 being adapted to receive soil therein through a funnel 930. The cylindrical enclosure 902 comprises a circular front face 904, a circular back face 906 and a cylindrical side wall 908 extending therebetween. The cylindrical enclosure 902 is tangentially mounted on left and right parallel sets of roller assemblies 910 and 912, the left and right sets of roller assemblies 910 and 912 being aligned along an axis parallel to the axis 950 of the cylindrical enclosure 902 in a bearing-like assembly. More specifically, the left set of roller assemblies 910 comprises a plurality of roller assemblies. Each roller assembly comprises a roller 916 rotationally mounted to a roller bracket 918. As the right set of roller assemblies 912 is similar to the left set of roller assemblies 910, no further description of the right set of roller assemblies 912 is needed. The front face 904 is provided with an axle 920 operatively mounted thereto, the axle extending outwardly and parallel to the axis 950 of the cylindrical enclosure 902. One will appreciate that when the axle 920 is coupled to rotation means (e.g. electric actuator, a hydraulic actuator, a pneumatic actuator or the like), such a configuration enables smooth rotation of the cylindrical enclosure 902 around its axis 950, while preventing lateral translation thereof.

The treatment cell 900 further comprises an inlet pipe 922 connected to the front face 904 of the cylindrical enclosure 902 and extending outwardly and perpendicularly therefrom. The inlet pipe 922 is further connected to heating means (not shown) for injecting hot air originating therefrom in the cylindrical enclosure 902. Similarly, the treatment cell 900 further comprises an outlet pipe 924 connected to the back face 906 of the cylindrical enclosure 902 and extending outwardly and perpendicularly therefrom. The outlet pipe 924 is further connected to a treatment assembly (not shown) for capturing volatized compounds or contaminants.

The skilled addressee will appreciate that the rotation of the cylindrical enclosure 902 advantageously contributes to the substantially uniform distribution of hot air through the cylindrical enclosure 902, the hot air being diffused from an intake pipe 922 to the outlet pipe 924. Furthermore, the rotation of the cylindrical enclosure 902 urges the mixing of soil provided therein, contributing to the substantially uniform distribution of, volatile compounds. Such configuration may thus increased speed of the treatment process. Such a configuration may further be adapted to be part of a mobile treatment unit. Accordingly, the present invention encompasses such applications of treatment cells, especially for mobile treatment units (e.g. on a van or a train).

As it will now be described, the invention further relates to the use of one or more treatment cells as described herein in a closed-loop system for removing unwanted volatile compounds from soil. The system preferably comprises a plurality of treatment cells connected in series to a treatment assembly 700. In the embodiment illustrated in FIG. 7, the treatment assembly 700 is operatively connected to the hot air pipe assembly 150 which is in open communication with one or more treatment cell 100. The treatment assembly 700 comprises a main inlet pipe 710 which exports heated air from the assembly to the cell 100 and an outlet pipe 720 which import into the treatment assembly air with volatile compounds recovered from the cell 100.

For withdrawing volatilized compounds from air incoming from outlet pipe 720, the treatment assembly 700 comprises a treatment unit 725. In one embodiment, the treatment unit 725 comprises to condenser 730 and an air/liquid separator 732 operatively connected to each other and to the outlet pipe 720. The condenser 730 and air/liquid separator 732 are operatively connected to provide effective means to cool and condense into liquid the vapor that is contained in the incoming air. Such condensation will remove water particles and volatile contaminants from the incoming air.

In one embodiment, the condenser 730 has a capacity ranging between about 80 m³/min of air to about 300 m³/min of air (i.e. 3 000 cubic feet per minute (CFM) to 10 000 CFM). The condenser 730 is preferably a device that uses cold water as cooling agent. Water supplied to the condenser 730 can be originate from regular source (e.g. city aqueduct) or may include rainwater stored in an in ground basin (see hereinafter) or water recovered from the treatment process and discarded to the drain 741. Preferably the condenser 730 is operatively connected to a cooler 742 in order to provide a continuous circulation and supply of cold water 743.

The air/liquid separator 732 may consists of a vertical axis separator with a tangential entry capable to treat a volume of air of approximately 225 m³/min (or 8,000 CFM). The air/liquid separator 732 may comprises an analogical level indicators (not shown) allowing activation of a draining pump 733 for carrying of the condensed water with contaminants toward the decantation basins 734.

The air/liquid separator 732 is further operatively connected to one or more water treatment units (e.g. decantation basins 734, an oily water separator (OWS) 736 connected to an oil reservoir 738, and/or a water filtration unit 740) which, depending of a user need may be facultative, but will help to ensure that the condensed water is substantially free of contaminants before being directed to the drain 741. For instance, the decantation basins 734 may allow a first physical separation step capable of separating lower density contaminants (e.g. diesel, which has a density of 0.85 Kg/L) from the water. In the illustrated embodiment, treatment assembly 700 includes two basins 734 adapted for allowing a settling period varying between 130 minutes and 400 minutes. The oily water separator (OWS) 736 may be helpful for removing from the water remaining hydrocarbon contaminants downstream from the basins 734. In one preferred embodiment the OWS 736 includes coalescent plates and it has a capacity of 200 l/min (about 50 US Gal per minute). The oil reservoir 738 may be useful in receiving the hydrocarbons collected by OWS 736. Those hydrocarbons may be further treated and reintroduced in the commercial chain, or as indicated herein after recycled as carburant for the heating means 760, thereby reducing the operation costs of the closed-loop system. Lastly, the water filtration unit 740 (e.g. an activated carbon water purifier) may be helpful in removing fine particles and remaining contaminants.

The treatment assembly 700 further comprises heating means 760 (e.g. a fuel or propane burner, an electric heater, etc.) operatively connected to the air/liquid separator 732 and the treatment cell 100. The heating means 760 has one main function, namely reheating and drying air to be directed to the treatment cell 100 through the main inlet pipe 710. The heating means 760 may also be helpful in burning any volatile contaminants which may remains in the incoming air after its passage through the air/liquid separator 732 and through a facultative carbon air purifier 754. The heating means 760 can also be adapted for burning oils recovered by the water treatment units and stored into the oil reservoir 738. Accordingly, in some embodiments, the heating means 760 is a burner and it comprises a chimney 764.

In one preferred embodiment, the heating means 760 is selected and adapted to heat circulating air to a temperature ranging from about 50° C. to about 300° C., and preferably to a temperature ranging from about 150° C. to about 200° C. In one exemplary situation, the heating means 760 provides 6,000,000 BTU (about 6.3 million kJ) at full capacity and approximately 2,000,000 BTU (2.1 million kJ) under operating conditions. Such heating devices are known in the art. It will be appreciated by a person skilled in the art that the heating means 760 can configured differently without departing from the scope of the invention. For instance, the heating means 760 could be an electric heater, a solar heater or any other heating assembly capable of heating the air to a desired temperature.

Heat of the air circulating in the system can be monitored using temperature sensors 762. Further, the treatment assembly 700 may includes analogical probes for monitoring the oxygen ($O_2$) and carbon dioxide ($CO_2$). Therefore, in the event that the percentage of $O_2$ lowers 8%, the analogical probe would control opening a valve to allow entry of fresh air and oxygen in the closed-loop system via a fresh air inlet 766, prior to being heated by the heating means 760. In one embodiment, the heating means 760 is operated for heating and maintaining the contaminated soil to a temperature equal to or below 100° C., and more preferably to a temperature ranging between about 60° C. and 80° C., thereby maximizing the efficacy of the process carried out in the system while reducing operations costs.

Figure 7:
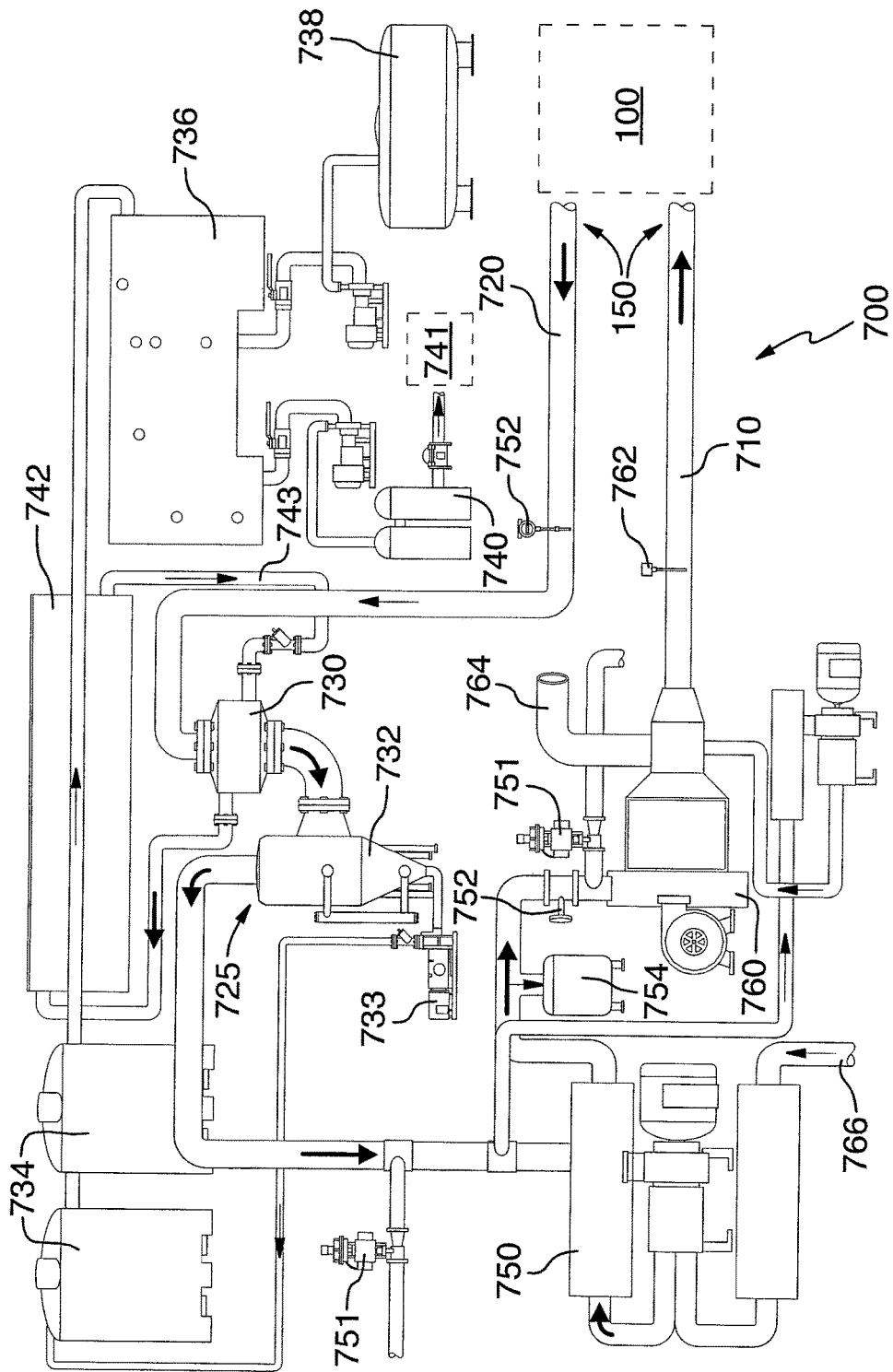
FIG. 7 is a schematic view of a treatment assembly in accordance with one embodiment of the closed-loop system of the present invention.

The treatment assembly 700 further comprises a pump 750 (e.g. vacuum pump or air blower) which, in the embodiment illustrated in FIG. 7, is operatively connected to the air/liquid separator 732 and to the heating means 760. The pump 750 works in cooperation with control valves 751 and actuator systems 752 controlled by a computer (not shown) for monitoring and maintaining an appropriate flow of air through the closed-loop system. In a preferred embodiment, the pump 750 is a vacuum pump which is selected and adapted such that the closed-loop system operates in a vacuum mode (e.g. between about 500 to about 700 mm of Hg), such vacuum minimizing leaks of air and contaminants into the environment. In one embodiment, the vacuum pump withdraws a volume of air of about 23 m³/min per treatment cell 100 (about 800 CFM) and it possesses a power of movement superior than the pressure losses of charge engendered in the network and the solid mass of soils to be treated.

To make operations of the treatment assembly 700 more economical, an heat exchanger may be connected to a rainwater basin fitted in depth in the ground. According to such embodiment the rainwater basin would benefit from the in ground temperature conditions for naturally cooling and maintaining rainwater to an average temperature ranging between 10° C. and 20° C. Such rainwater may useful for feeding the condenser 730, thereby reducing operation costs of the system associated with the use of a cooler 742. The rainwater basin may also connect to the drain 741 for receiving the water exiting the water filtration unit 740.

Similarly, for operations under vacuum conditions, it is preferable that the components of the system be configured to avoid air-leaks for improving efficiency of the closed-loop system. Accordingly, the pipe assembly 150, the inlet 710 and outlet 720 pipes, the pumps, sensors, valves, the treatment cells 100 and other devices, as well as the connections therebetween are preferably adapted to be substantially air-tight. However, it is understood that absolute air-tightness is not required since, under negative pressure, air leaks will cause fresh air to enter the system while still preventing volatilized contaminants to exit the same. In one alternate embodiment, one may choose to create a positive pressure to circulate air through the system, and under such circumstances, a greater air-tightness may be required since any air leak may result in volatilized contaminant escaping from the system into the atmosphere.

It will also be appreciated that the number, size, capacity of the numerous elements comprising the system (e.g. condenser, air/liquid separator, heater, basins, pumps, purifier, etc) are selected according a user's need and will vary according to different factors, including, but not limited to, the volume, density and humidity of the soil to be treated, the number and volume of the treatment cells connected to the system, the volume of air to be treated and the humidity content thereof.

Figure 10:
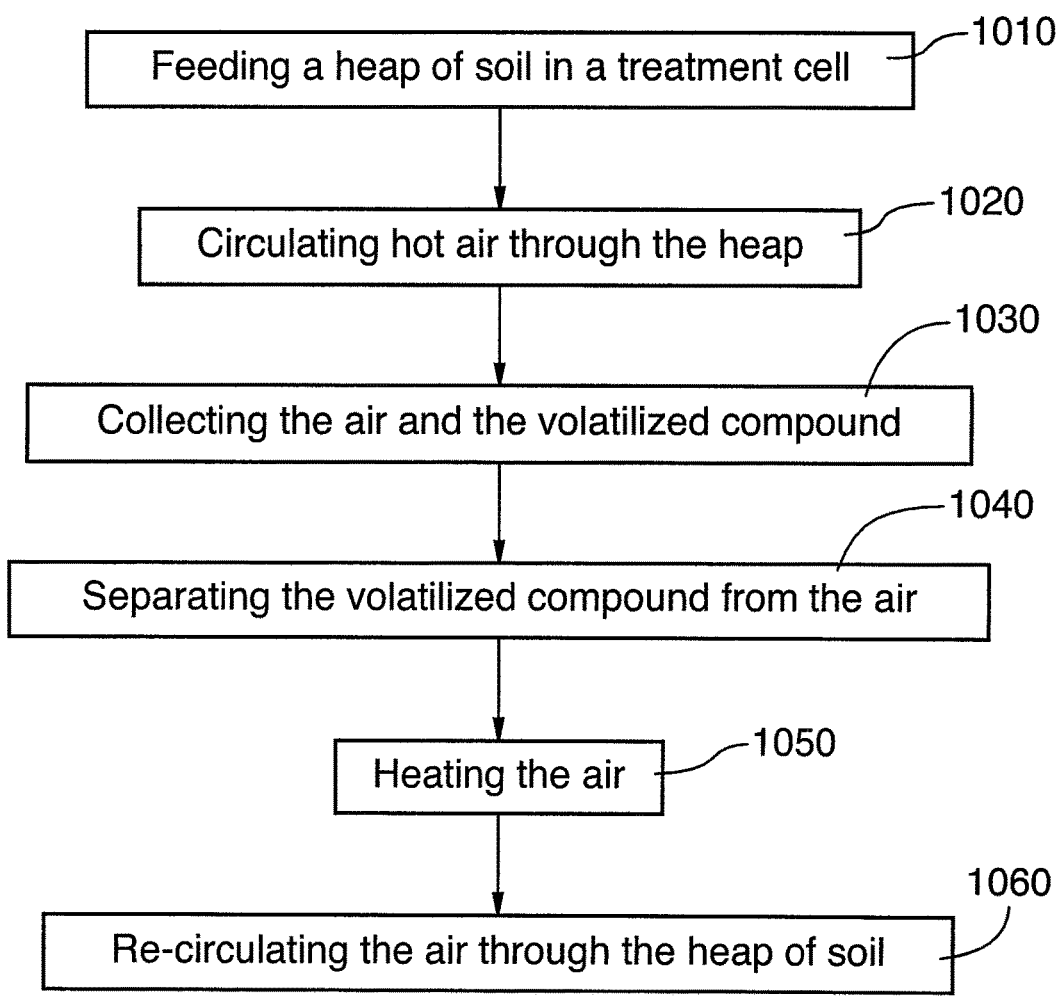
FIG. 10 is a flowchart showing a method for removing an unwanted volatile compound from a heap of soil in accordance with one embodiment of the present invention.

As indicated hereinbefore, the present invention relates to a method for removing an unwanted volatile compound from a heap of soil. Referring to FIG. 10 which summarized on embodiment of a method according to the invention, the method includes the steps of feeding a heap of soil into a rigid and substantially air-tight treatment cell (1010), circulating a stream of heated air through the heap of soil to increase the temperature of the soil sufficiently to allow volatilization of said compound (step 1020), collecting the air and the volatilized compound (step 1030), separating the volatilized compound from the air collected (step 1040), heating or reheating the air substantially exempt from volatile compound (step 1050) and re-circulating the heated air through the heap of soil (step 1060).

A typical use of the methods, treatment cells and systems according to the invention is exemplified in details hereinafter. An amount of soil is removed from a contaminated site using an excavator and further loaded on a dump truck or the like to be transported on the treatment site. A person skilled in the art will appreciate that the amount of soil removed from such a contaminated site will vary from time to time and is dependent upon the scale of contamination (i.e. size of the contaminated site, level of contamination, etc.). The contaminated material is transported to a treatment site comprising suitable industrial installations for decontaminating soils according to the invention and dumped in a storage area designed to receive such contaminated material and preventing any contamination of surrounding environment. At the treatment site heavy equipment, such as front loader, is used to carry the contaminated site from the storage area, into the treatment cell 100 (step 1010). One skilled in the art will appreciated that the contaminated soils could be transported from the contaminated site directly into the treatment cell 100 rather than being stored in the storage area.

To feed the cell 100 with the contaminated soil, the door 115 is lifted out using a front loader allowing access to the interior of the cell 100 for the heavy equipment. The heavy equipment partially enters the cell 100 and dumps the contaminated material over the pipes 220, 222 embedded in a gravel bed 30. To facilitate loading of the cell 100 with contaminated soil, the cover 116 of the cell 100 can also be removed using an excavator, where appropriate. The cell 100 is filled with contaminated soil until a sufficient heap or layer of soil is reached. An air space of about 15 cm (about 6 inches) between the top of the heap of contaminated soil and the exhaust pipe array 410 is preferably left to enable a proper circulation of air and volatilized contaminants in the cell 100 and to avoid clogging of the perforations of the secondary pipes 422 of the exhaust pipe array 410.

Once a proper amount of contaminated soil has been loaded in the cell 100, the door 115 is slid back into the front wall 114 and the sealing means 610 are properly installed. Where the cover 116 has been removed, it is placed back onto the walls 112, 113, 114 to close the cell 100 in a substantially air-tight manner.

Substantially air-tight as intended herein means that the cell 100 (or other treatment cells that may be used) does not require absolute air-tightness as long as the operation of the system substantially prevents unwanted release of the volatized contaminants in the atmosphere such as by operating under slight negative pressure (i.e. the air pressure in the system is lower than the pressure outside the system). In such case, the negative pressure in the system will cause fresh air to enter rather than exit the system. Where the system operates under positive pressure (i.e. the air pressure inside the system is greater than the pressure outside the system), volatilized contaminants are more susceptible to escape therefrom and the various components of the system may require enhanced air-tightness.

Starting the vacuum pump 750 causes heated air to circulate through the system and through the heap of soil (step 1020). It will be understood that prior to entering the treatment cell 100, the heated air has to be warmed by the heating means 760 which, in the embodiment illustrated in FIG. 7, are located between the vacuum pump 750 and the main inlet pipe 710. The heating means preferably heats the air to a temperature ranging from about 150° C. to about 200° C. It will however be acknowledged that the temperature of the heated air can be adjusted to any temperature capable of providing satisfactorily results. The efficiency of the process relying, at least partially, on the fact that water saturation of hot air is much higher that water saturation of ambient air.

In operation, the vacuum pump 750 provides a negative pressure, preferably ranging from 500 mm Hg to 700 mm Hg as measured in the main exhaust pipe 720, which in turn create an negative pressure within the cell 100 thereby causing the heated air of the main inlet pipe 710 to enter the main inlet pipe 210 of the cell 100, then the smaller distribution pipes 222 and finally and the cell 100 via the perforations 224. The heated air thus enters at the bottom of the enclosure 110, and migrates toward the top thereof, through the contaminated soil 20. As the heated air percolates 50 through the contaminated soil 20, it causes volatilization of water and contaminants contained therein to migrate into the air space between the top of the heap 20 and the cover 116 of the cell 100. Once in the air space, the air charged with volatilized contaminants and water vapor (i.e. the contaminated air) is captured by the exhaust pipe array 410 to be moved toward the treatment unit 725 of the treatment assembly 700 via the exhaust pipe 720 (step 1030). More specifically, the vacuum pump forces the contaminated air to enter the collection pipes 422 through perforations 424, to move in the main outlet pipe 420 and circulate through the hot air pipe assembly 150 to enter the treatment assembly 700 via the outlet pipe 720.

Without being bound by any scientific principles, it may be interesting to note that percolation of hot air through the contaminated soil causes the temperature thereof to increase (warm-up phase) and to further stabilize at about 100° C., due to the presence of water within the soil (constant phase). During these phases, contaminants are volatilized to further be collected, as best described below. The success of the process does however not require the temperature of the soil to be increased and maintained at 100° C. It was indeed surprisingly found that soil temperature ranging from about 60° C. to about 90° C. are sufficient to fully volatilize water and hydrocarbon contaminants such as gasoline and diesel. As such, the use of lower soil temperature may reduce the costs associated with the operation of the system. The temperature of the soil is monitored by probes and computers and maintained to a desired temperature by allowing fresh air to enter the system via fresh air inlet 766 or by-pass, if required.

In the treatment unit 725, the contaminated air is treated to remove contaminants and water therefrom (step 1040). The treatment unit 725 enables recuperation of water and contaminants and provides cooled air with low moisture content. Such relatively dry air will further be moves toward the heating means 760 for further be warmed (step 1050) prior to re-entering the treatment cell 100 (step 1060), where removal of water from the air (i.e. reduction of the moisture content) facilitates heating thereof and contributes to reduce the costs associated with the operation of the treatment assembly 700.

Once substantially all the water contained in the soil has volatilized and been collected, the temperature of the soil tends to increase above 100° C., thereby indicating completion of the process. Typically the process in complete when air collected above the soil has a temperature of about 70°

C.-80° C. The relative humidity of the air collected above the soil may also provide an indication of the process completion. Typically, the treatment process will have been completed when measuring a relative humidity lower than 30% (at a temperature of 60° C. or higher) in the air collected. It is also possible to directly sample the soil to check its humidity. In such case, one will conclude that the process in generally complete when the humidity in the soil is about 1% to about 3%. In one embodiment, the process has a duration ranging between 1 and 20 days, and preferably between 3 and 15 days and more preferably between 5 and 10 days. A person skilled in the art will nevertheless understand that the duration of the process will vary according to various factors such as the moisture content, the nature, density and the amount of soil to be treated. Upon ending of the process, the door 115 is removed from the cell 100 and the decontaminated soil is removed from the cell enclosure 110 using a front loader. The decontaminated soil may then undergo screening steps and further decontamination steps to remove contaminants not eliminated by the process of the invention.

Once the cell 100 emptied, a new batch of contaminated soil can be fed therein. It is thus apparent that systems, methods and treatment cells according to the invention can be used repetitively without the need of disassembling the pipes composing the air intake 210 and air exhaust 410 since the cell 100 comprises a rigid or permanent structure.

Although the foregoing description and accompanying drawings relate to specific preferred embodiments of the present invention as presently contemplated by the inventor, it will be understood that various changes, modifications and adaptations, may be made without departing from the scope of the invention.

The invention claimed is:

1. A treatment cell for removing an unwanted volatile compound from a heap of soil comprising:
an openable and reclosable rigid and heat-resistant enclosure adapted for receiving said heap of soil, wherein the enclosure is made from at least one of concrete and steel, is adapted for operation at a temperature of at least 150° C., and is adapted for operation at a negative pressure reaching at least 700 mm Hg (700 Torr), said enclosure comprising a rigid and heat-resistant base, a plurality of rigid and heat-resistant side walls, a rigid and heat-resistant cover, and at least one openable and reclosable rigid opening with sealing means for minimizing entry of air into the enclosure under negative pressure conditions, wherein said enclosure is sized and adapted to allow circulation of heavy mechanical equipment in and out of said rigid and heat-resistant enclosure, and wherein said at least one opening is sized and adapted to allow transport of soil in and out of the treatment cell by said heavy mechanical equipment; and
an air intake and an air exhaust operatively connected to said enclosure, the air intake and the air exhaust being configured and positioned to maximize a uniform distribution of hot air through said heap of soil and to ensure distribution of the hot air through the entirety of said heap of soil, the air intake and the air exhaust being further configured and positioned to input and output the hot air, respectively, under the negative pressure conditions, wherein the air exhaust comprises a plurality of perforated collection pipes configured to spread over an upper portion of the enclosure and at a distance above the soil in order to leave an empty air space between the collection pipes and the soil when the soil is placed in the enclosure, wherein said air intake comprises a plurality of perforated distribution pipes configured to spread over a bottom portion of the enclosure and under the soil when the soil is placed in the enclosure, and wherein said air intake comprises protective means for protecting said distribution pipes from being crushed by heavy mechanical equipment circulating in and out of the treatment cell;
wherein the enclosure, the air intake, and the air exhaust are substantially air-tight in order to reach a negative pressure of at least 700 mm Hg (700 Torr) in the treatment cell when the air intake and the air exhaust are operatively connected in a closed-loop to at least one vacuum pump.

2. The treatment cell of claim 1, wherein the air intake is fixedly connected to the bottom portion of the enclosure.

3. The treatment cell of claim 1, wherein the air exhaust is fixedly connected to the cover, the cover being removably mounted to the upper portion of the enclosure.

4. The treatment cell of claim 1, further comprising a pump and heating means both operatively connected to the air intake for introducing the hot air into the enclosure.

5. The treatment cell of claim 1, further comprising a treatment unit operatively connected to the air exhaust for removing compounds volatilized from the heap of soil.

6. The treatment cell of claim 5, wherein the treatment unit comprises a condenser for condensing into liquid the volatilized compounds.

7. The treatment cell of claim 1, wherein said enclosure is sized and adapted for receiving at least 200,000 kg of soil.

8. The treatment cell of claim 1, wherein the protective means comprises a bed of an inert material embedding the distribution pipes and/or an array of rails extending over the distribution pipes.

9. The treatment cell of claim 1, wherein the sidewalls are made of reinforced concrete and have a thickness of at least 20 centimeters.

10. The treatment cell of claim 1, wherein said enclosure is sized to receive at least 180 tons of soil.

11. The treatment cell of claim 1, wherein said enclosure comprises an internal width of at least 6.7 meters (22 feet), an internal depth of at least 7.6 meters (25 feet), and an internal height of at least 3.0 meters (10 feet).

12. The treatment cell of claim 1, wherein the plurality of perforated collection pipes are configured to spread entirely at a distance above a soil area when the soil is placed in the enclosure, and wherein the plurality of perforated distribution pipes are configured to spread entirely under a soil area when the soil is placed in the enclosure.

13. The treatment cell of claim 1, wherein said cell further provides for removal of fine particles comprising heavy metal.

14. A method for removing an unwanted volatile compound from a heap of soil comprising the steps of:
a) placing said heap of soil within an openable, reclosable, heat-resistant, and substantially air-tight rigid enclosure made from at least one of concrete and steel, the enclosure adapted for operation at a temperature of at least 150° C. and adapted for operation at a negative pressure reaching at least 700 mm Hg (700 Torr), wherein said enclosure comprises a rigid and heat-resistant base, a plurality of rigid and heat-resistant side walls, and a rigid and heat-resistant cover, wherein said enclosure is sized and adapted to allow circulation of heavy mechanical equipment in and out of the enclosure and further wherein said enclosure comprises at least one openable and reclosable rigid opening sized and adapted to allow transport of soil in and out of the enclosure by said heavy mechanical equipment, the enclosure being operatively connected to an air intake and an air exhaust which in turn are further configured and positioned to maximize a uniform distribution of hot air through said heap of soil and to ensure distribution of the hot air through the entirety of said heap of soil under negative pressure conditions, wherein the air exhaust comprises a plurality of perforated collection pipes configured to spread over an upper portion of the enclosure and at a distance above the soil in order to leave an empty air space between the collection pipes and the soil when the soil is placed in the enclosure, wherein said air intake comprises a plurality of perforated distribution pipes configured to spread over a bottom portion of the enclosure and under the soil when the soil is placed in the enclosure, and wherein said air intake comprises protective means for protecting said distribution pipes from being crushed by heavy mechanical equipment circulating in and out of the enclosure; and b) creating a negative pressure throughout an interior of the rigid enclosure by operatively connecting the air intake and the air exhaust to the enclosure via at least one vacuum pump and circulating heated air through said heap of soil to gradually increase the temperature of the soil to a temperature allowing volatilization out from the soil of at least a portion of said volatile compound.

15. The method of claim 14, wherein the heated air is introduced into said enclosure at a temperature of about 150° C. to about 200° C.

16. The method of claim 14, wherein soil temperature is maintained at a temperature ranging from about 60° C. to about 130° C.

17. The method of claim 14, further comprising the steps of collecting air having circulated through said heap of soil and removing therefrom said volatilized compound.

18. The method of claim 17, further comprising the steps of re-heating air collected and recirculating said reheated air through said heap of soil.

19. The method of claim 14, wherein the volatile compound is water or a hydrocarbon contaminant.

20. The method of claim 19, wherein the hydrocarbon contaminant is selected from the group consisting of gasoline, diesel, jet fuel, heating fuel, liquefied petroleum gas, oils, and petroleum derivatives.

21. The method of claim 14, wherein said at least one vacuum pump has a capacity to create said negative pressure of at least 700 mm Hg (700 Torr) while withdrawing from the treatment cell a volume of air of at least 800 CFM.

22. The method of claim 14, wherein step b) comprises creating a negative pressure of at least 700 mm Hg (700 Torr).

23. The method of claim 14, wherein step b) comprises creating a negative pressure of at least 500 mm Hg (500 Torr).

24. The method of claim 14, wherein the plurality of perforated collection pipes are configured to spread entirely at a distance above a soil area when the soil is placed in the enclosure, and wherein the plurality of perforated distribution pipes are configured to spread entirely under a soil area when the soil is placed in the enclosure.

25. The method of claim 14, further comprising step (c) of removing fine particles comprising heavy metals.

26. A closed-loop system for removing unwanted volatile compounds from a heap of soil comprising:

an openable, reclosable, heat-resistant, and substantially air-tight rigid enclosure made from at least one of concrete and steel, the enclosure shaped and sized for receiving said heap of soil, wherein said air-tight rigid enclosure can sustain a temperature of at least 150° C. and can sustain a negative pressure of at least 700 mm Hg (700 Torr), wherein said enclosure comprises a rigid and heat-resistant base, a plurality of rigid and heat-resistant side walls, and a rigid and heat-resistant cover, wherein said enclosure is sized and adapted to allow circulation of heavy mechanical equipment in and out of said rigid and heat-resistant enclosure and further wherein said enclosure comprises at least one openable and reclosable rigid opening sized and adapted to allow transport of soil in and out of the enclosure by said heavy mechanical equipment;

an air intake operatively connected to the enclosure for injecting heated air into the heap of soil and an air exhaust operatively connected to the enclosure for collecting heated air having circulated through the heap of soil, the air intake and the air exhaust being both fixedly mounted to said enclosure and being both configured and positioned to maximize a uniform distribution of hot air through said heap of soil and to ensure distribution of the hot air through the entirety of said heap of soil under negative pressure conditions, wherein the air exhaust comprises a plurality of perforated collection pipes configured to spread over an upper portion of the enclosure and at a distance above the soil in order to leave an empty air space between the collection pipes and the soil when the soil is placed in the enclosure, wherein said air intake comprises a plurality of perforated distribution pipes configured to spread over a bottom portion of the enclosure and under the soil when the soil is placed in the enclosure, and wherein said air intake comprises protective means for protecting said distribution pipes from being crushed by heavy mechanical equipment circulating in and out of the enclosure;

at least one vacuum pump operatively connected to the air intake and the air exhaust for introducing under negative pressure the heated air into the enclosure, for circulating under negative pressure the heated air through the closed-loop system, and for creating a negative pressure inside the rigid enclosure;

heating means operatively connected to the pump for providing the heated air to be circulated through the heap of soil; and a treatment unit operatively connected to the air exhaust and to the heating means, wherein said treatment unit comprises a condenser for condensing into liquid volatilized compounds.

27. The closed-loop system of claim 26, wherein circulation of heated air through said heap of soil gradually increases the temperature of the soil to a temperature allowing volatilization out from the soil of at least a portion of the volatile compounds contained therein.

28. The closed-loop system of claim 26, comprising a plurality of substantially air-tight cells each adapted to receive at least 200,000 kg of soil.

29. The closed-loop system of claim 26, wherein the volatile compound is water or a hydrocarbon contaminant.

30. The closed-loop system of claim 29, wherein the hydrocarbon contaminant is selected from the group consisting of gasoline, diesel, jet fuel, heating fuel, liquefied petroleum gas, oils, petroleum derivative and mixtures thereof.

31. The closed-loop system of claim 26, wherein the at least one vacuum pump creates a negative pressure of at least 700 mm Hg (700 Torr).

32. The closed-loop system of claim 26, wherein the at least one vacuum pump creates a negative pressure of at least 500 mm Hg (500 Torr).

33. The closed-loop system of claim 26, wherein the plurality of perforated collection pipes are configured to spread entirely at a distance above a soil area when the soil is placed in the enclosure, and wherein the plurality of perforated distribution pipes are configured to spread entirely under a soil area when the soil is placed in the enclosure.

34. The system of claim 26, further screening means for removing from the heap of soil fine particles comprising heavy metals.

35. A method for removing an unwanted volatile compound from a heap of soil comprising the steps of:
   a) placing said heap of said soil into a treatment cell according to claim 1;
   b) creating a negative pressure of at least 700 mm Hg (700 Torr) on top of the heap of soil placed into the treatment cell;
   c) circulating under negative pressure a volume of heated air through said heap of soil to gradually increase the temperature thereof for reaching a temperature sufficient to allow volatilization out from the soil of at least a portion of the volatile compound;
   d) collecting heated air of step (c) comprising a volatile compound volatilized therein;
   e) separating at least a portion of said volatilized compound from said air;
   f) re-heating air of step (e); and
   g) introducing the re-heated air of step (f) under negative pressure into the treatment cell for re-circulation through said heap of soil.

36. The method of claim 35, wherein step (e) comprises cooling and condensing into liquid vapor contained in the collected heated air.

37. The method of claim 35, wherein steps (c) to (g) are repeated until said heap of soil is relatively exempt from said volatile compound.

38. The method of claim 35, wherein steps (c) to (g) are repeated until humidity in the soil is about 1% to about 3%.

39. The method of claim 35 for valorizing a heap of soil.

40. The method of claim 35, wherein the volatile compound is water or a hydrocarbon contaminant.

41. The method of claim 40, wherein the hydrocarbon contaminant is selected from the group consisting of gasoline, diesel, jet fuel, heating fuel, liquefied petroleum gas, oils, petroleum derivatives and mixtures thereof.

42. The method of claim 35, further comprising step (h) of removing fine particles comprising heavy metals.

43. An industrial installation for decontaminating soils, the industrial installation being capable of decontaminating at least 200,000 kg of soil on a daily basis and comprising a plurality of treatment cells as defined in claim 1 operatively connected together in a closed-loop system.

44. A treatment cell for removing an unwanted volatile compound from a heap of soil comprising:
   an openable and reclosable rigid and heat-resistant enclosure adapted for receiving said heap of soil, wherein the enclosure is made from material resistant to a temperature of at least 150° C. and resistant to a negative pressure reaching at least 700 mm Hg (700 Torr), wherein the enclosure comprises a base, a plurality of side walls, and at least one openable and reclosable rigid opening with sealing means for minimizing entry of air into the enclosure under negative pressure conditions, wherein said enclosure is permanent and is sized and adapted to allow circulation of heavy mechanical equipment transporting said soil in and out of said enclosure; and
   an air intake and an air exhaust operatively connected to said enclosure, the air intake and the air exhaust being configured and positioned to maximize distribution of hot air through the entirety of said heap of soil, the air intake and the air exhaust being further configured and positioned to input and output, respectively, the hot air under the negative pressure conditions, wherein the air exhaust comprises a plurality of perforated collection pipes configured to spread over an upper portion of the enclosure and at a distance above the soil in order to leave an empty air space between the collection pipes and the soil when the soil is placed in the enclosure, wherein said air intake comprises a plurality of perforated distribution pipes configured to spread over a bottom portion of the enclosure and under the soil when the soil is placed in the enclosure, wherein said air intake comprises protective means for protecting said distribution pipes from being crushed by heavy mechanical equipment circulating in and out of the treatment cell, and wherein the enclosure, the air intake, and the air exhaust are substantially air-tight in order to reach a negative pressure of at least 700 mm Hg (700 Torr) in the treatment cell when the air intake and the air exhaust are operatively connected to at least one vacuum pump.

45. The treatment cell of claim 44, wherein at least one of the base, the side walls, and the openable and reclosable rigid opening is made from at least one of concrete and steel.

46. A method for removing an unwanted volatile compound from a heap of soil comprising the steps of:
   a) placing said heap of soil within an openable, reclosable, heat-resistant, and substantially air-tight rigid enclosure made from material resistant to a temperature of at least 150° C. and resistant to a negative pressure reaching at least 700 mm Hg (700 Torr),
      wherein said enclosure comprises a rigid and heat-resistant base, a plurality of rigid and heat-resistant side walls, and a rigid and heat-resistant cover,
      wherein said enclosure is permanent and is sized and adapted to allow circulation of heavy mechanical equipment in and out of the enclosure,
      wherein the enclosure is operatively connected to an air intake and an air exhaust which in turn are further configured and positioned to maximize distribution of hot air through the entirety of said heap of soil under negative pressure conditions,
      wherein the air exhaust comprises a plurality of perforated collection pipes configured to spread over an upper portion of the enclosure and at a distance above the soil in order to leave an empty air space between the collection pipes and the soil when the soil is placed in the enclosure,
      wherein the air intake comprises a plurality of perforated distribution pipes configured to spread over a bottom portion of the enclosure and under the soil when the soil is placed in the enclosure, and
      wherein the air intake comprises protective means for protecting said distribution pipes from being crushed by heavy mechanical equipment circulating in and out of the enclosure; and b) creating a negative pressure of at least 700 mm Hg (700 Torr) throughout an interior of the rigid enclosure by operatively connecting the air intake and the air exhaust to the enclosure via at least one vacuum pump and circulating heated air through said heap of soil to gradually increase the temperature of the soil to a temperature allowing volatilization out from the soil of at least a portion of said volatile compound.

47. The method of claim 46, wherein the heated air is introduced into said enclosure at a temperature of about 150° C. to about 200° C.

48. The method of claim 46, wherein the soil is maintained at a temperature ranging from about 60° C. to about 130° C.

49. The method of claim 46, further comprising step c) of condensing into liquid volatilized compounds.

* * * * *